(12) United States Patent
Gresser

(10) Patent No.: US 8,874,291 B2
(45) Date of Patent: Oct. 28, 2014

(54) ELECTRICITY GENERATING SUSPENSION SYSTEM FOR HYBRID AND ELECTRIC AUTOMOBILES

(75) Inventor: German Gresser, Würzburg (DE)

(73) Assignee: Intertronic Gresser GmbH, Wurzburg (DE)

(*) Notice: Subject to any disclaimer, the term of this patent is extended or adjusted under 35 U.S.C. 154(b) by 316 days.

(21) Appl. No.: 13/380,197

(22) PCT Filed: Jun. 24, 2010

(86) PCT No.: PCT/DE2010/000727
§ 371 (c)(1),
(2), (4) Date: Aug. 13, 2012

(87) PCT Pub. No.: WO2010/149149
PCT Pub. Date: Dec. 29, 2010

(65) Prior Publication Data
US 2012/0303193 A1    Nov. 29, 2012

(30) Foreign Application Priority Data

Jun. 24, 2009    (DE) .......................... 10 2009 060 999

(51) Int. Cl.
*B60L 11/00* (2006.01)
*B60L 15/00* (2006.01)
(Continued)

(52) U.S. Cl.
CPC .............. *B60K 25/10* (2013.01); *Y02T 10/648* (2013.01); *Y02T 10/90* (2013.01); *B60G 2300/60* (2013.01); *B60G 2400/5182* (2013.01);
(Continued)

(58) Field of Classification Search
CPC ..... B60W 10/24; B60W 10/26; B60W 20/00; B60W 20/106; B60W 2510/24; B60W 2510/242

USPC ........... 701/3, 21–22, 81, 490, 123; 903/903, 903/906, 907; 440/6
See application file for complete search history.

(56) References Cited

U.S. PATENT DOCUMENTS 4,032,829 A    6/1977    Schenavar
5,060,959 A    10/1991    Davis et al.
(Continued)

FOREIGN PATENT DOCUMENTS

CN    1739996    3/2006
DE    4134730    4/1992
(Continued)

OTHER PUBLICATIONS

International Search Report mailed Apr. 6, 2011, which issued in corresponding International Application No. PCT/DE2010/000727.

(Continued)

*Primary Examiner* — Mary Cheung
*Assistant Examiner* — Atul Trivedi
(74) *Attorney, Agent, or Firm* — Fish & Richardson P.C.

(57) ABSTRACT

The invention relates to vehicles for transporting persons and/or goods, which vehicles travel on roads or alternatively on rails and at least partially use electrical energy using electric motors as drive units, wherein the electrical energy used is predominantly or substantially produced within the vehicle by converting kinetic energy, in particular components of the kinetic energy that are caused on the vehicle bodywork as gravitation effects and components of the kinetic energy from curve centrifugal forces and acceleration motions of the vehicle body, the vertical dynamic acceleration motions of the wheels and wheel suspensions, and other components, wherein the electrical energy generated in such away is temporarily stored in chemical energy stores (batteries) and/or other suitable storage media, for example, high-power capacitors or flywheel stores, until the electricity is used in the vehicle drive motors and/or other loads.

15 Claims, 9 Drawing Sheets

(51) Int. Cl.
    *B60W 10/24*     (2006.01)
    *B60W 10/26*     (2006.01)
    *B60W 20/00*     (2006.01)
    *B60K 16/00*     (2006.01)
    *B60L 11/16*     (2006.01)
    *B60G 17/015*     (2006.01)
    *B60L 8/00*     (2006.01)
    *B60K 25/10*     (2006.01)

(52) U.S. Cl.
    CPC ....... *B60G 2400/252* (2013.01); *Y02T 10/7022* (2013.01); *B60K 16/00* (2013.01); *B60L 11/16* (2013.01); *B60G 2204/30* (2013.01); *B60L 2200/26* (2013.01); *B60L 17/0157* (2013.01); *Y02T 10/7083* (2013.01); *Y02T 10/7027* (2013.01); *Y02T 10/646* (2013.01); *B60L 8/00* (2013.01); *Y02T 10/7033* (2013.01); *B60L 11/005* (2013.01); *B60G 2202/413* (2013.01); *Y10S 903/903* (2013.01); *Y10S 903/906* (2013.01); *Y10S 903/907* (2013.01)
    USPC ............. 701/22; 903/903; 903/906; 903/907; 180/65.265; 180/65.29; 180/65.31; 701/81

(56) References Cited

U.S. PATENT DOCUMENTS

| | | | |
|---|---|---|---|
| 5,263,558 A | 11/1993 | Yamaoka | |
| 5,578,877 A | 11/1996 | Tiemann | |
| 6,952,060 B2 | 10/2005 | Goldner et al. | |
| 8,074,755 B2 * | 12/2011 | Abe et al. | 180/65.265 |
| 8,220,569 B2 * | 7/2012 | Hassan | 180/2.2 |
| 2001/0013731 A1 * | 8/2001 | Shinohara et al. | 310/85 |
| 2003/0034697 A1 * | 2/2003 | Goldner et al. | 310/17 |
| 2003/0057004 A1 * | 3/2003 | Morishita et al. | 180/65.2 |
| 2003/0148843 A1 * | 8/2003 | Bowen | 475/5 |
| 2006/0219447 A1 * | 10/2006 | Saitou et al. | 180/65.2 |
| 2007/0175716 A1 | 8/2007 | Kim | |
| 2007/0213160 A1 * | 9/2007 | Lyons et al. | 475/5 |
| 2008/0093135 A1 * | 4/2008 | Nomura et al. | 180/65.2 |
| 2008/0125928 A1 * | 5/2008 | Conlon et al. | 701/22 |
| 2008/0185199 A1 * | 8/2008 | Kimura et al. | 180/65.2 |
| 2008/0263731 A1 * | 10/2008 | Tabe | 903/903 |
| 2009/0145673 A1 * | 6/2009 | Soliman et al. | 180/65.1 |
| 2009/0250280 A1 * | 10/2009 | Abe et al. | 180/65.285 |

FOREIGN PATENT DOCUMENTS

| | | |
|---|---|---|
| DE | 4212839 | 11/1992 |
| DE | 29518322 | 1/1996 |
| DE | 10203802 | 10/2002 |
| DE | 10147720 | 4/2003 |
| DE | 10220846 A1 | 11/2003 |
| DE | 102006035759 A1 | 2/2008 |
| JP | 4215510 | 8/1992 |
| JP | 5044754 | 2/1993 |
| JP | 10047405 | 2/1998 |
| JP | 2001310736 | 11/2001 |
| WO | WO2005089347 A2 | 9/2005 |

OTHER PUBLICATIONS

SIPO Office Action for CN Application No. 201080036640.8, dated Dec. 2, 2013.

* cited by examiner

ELECTRICITY GENERATING SUSPENSION SYSTEM FOR HYBRID AND ELECTRIC AUTOMOBILES

CROSS REFERENCE TO PRIOR APPLICATIONS

This is a U.S. National Phase application under 35 U.S.C. §371 of International Patent Application No. PCT/DE2010/000727, filed Jun. 24, 2010, and claims the priority of German Patent Application No. 10 2009 060 999.7, filed Jun. 24, 2009 both of which are incorporated by reference herein in their entirety. The International Application published in German on Dec. 29, 2010 as WO 2010/149149 under PCT Article 21(2).

The automotive industry is currently under great political and economic pressure to technically realise the necessary $CO_2$ limit of 120 g/km, which must be at least reached as a "fleet average" by 2015.

In view of the known, inevitably approaching end of oil production in sufficient quantities in possibly 20-30 years and a development time of at least 10 years for electric cars ready for series production, it is high time for the industry to say goodbye to the outdated technology of the internal combustion engine, and also give up on the hydrogen engine, with its unprofitable levels of efficiency, as electric drives are in many respects the ideal solution for motor vehicles.

It is true that the electric cars recently planned by the industry still have considerable shortcomings, namely the insufficient electricity storage capacity of the batteries used and consequently insufficient range.

There are currently also further disadvantages, for example the heavy weight and large volume of the lithium ion batteries, with huge production costs and at present still uncertain service life, and a much too long recharging time of several hours. Although there will be considerable improvement and technical progress in the near future, the fundamental battery problems of electric cars remain, if completely new ways of optimising energy with in-vehicle electricity generation in electric cars are not adopted to at least partially compensate for these problems, which is the object of this invention.

A known method of recovering kinetic energy in the electric car during driving is the generator function of the drive motor during braking. The amount of energy recovered in this manner is however relatively small.

This invention offers the possibility of supplying energy to the hybrid and electric car in a novel manner and in considerable amounts during driving by means of in-vehicle, autonomous energy generation by converting the kinetic energy present during driving, in particular from relevant components of gravitational and centrifugal energy, into electricity.

Figure 1:
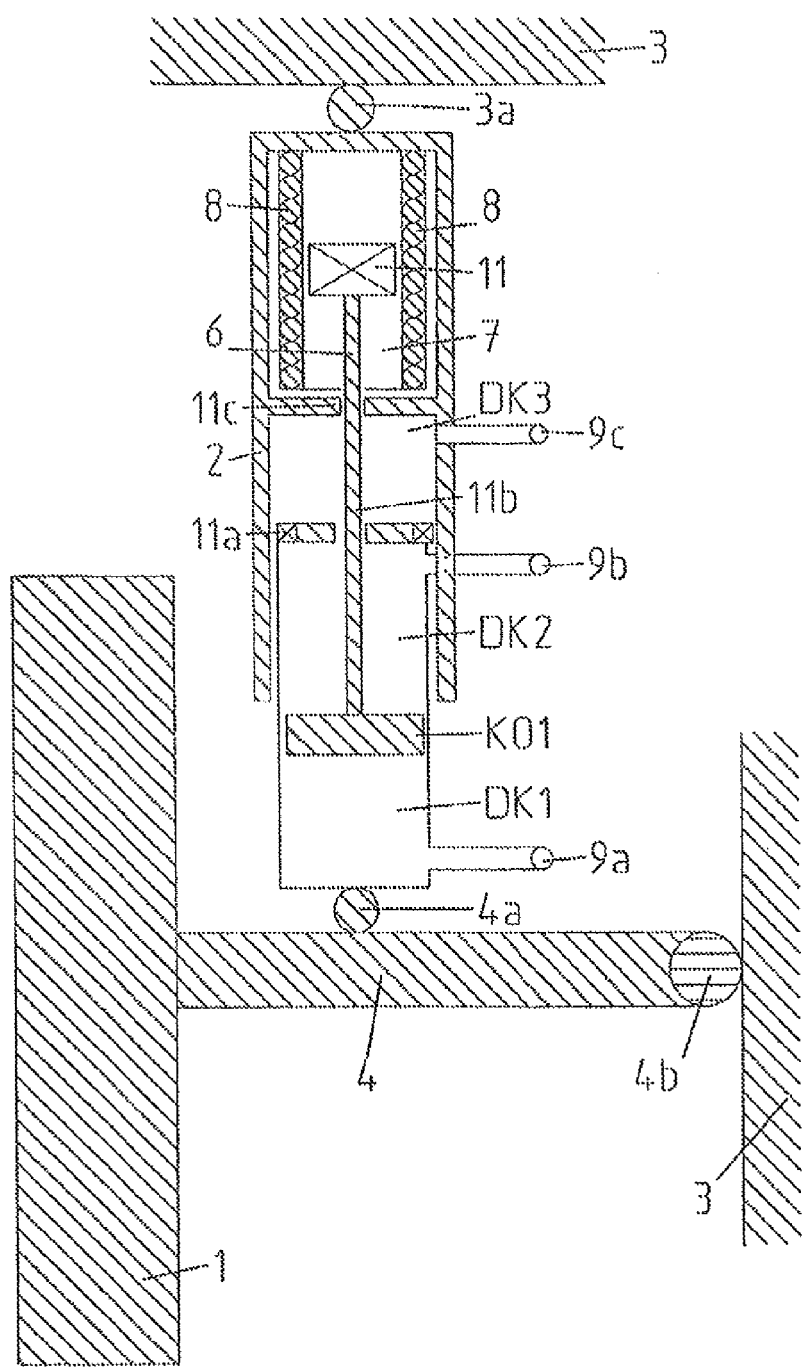
FIG. 1 and FIG. 2 are diagrams of an exemplary embodiment of the invention as a basic, identical and schematic vertical section of a vehicle wheel (1) with a wheel suspension (4) which is fastened to the body (3) with the joint (4b) and a suspension element (2) with an integrated linear generator (7).

There are many variations of the technical realisation of this invention. Only a few advantageous, preferred variants are described in this description. All other conceivable versions which can be derived therefrom likewise form the subject matter of this invention and fall under the protection thereof.

Reference is made to the dependent patent claims and to the explanations of the preferred embodiments below. Also included within the inventive concept are the advantageous configurations arising from any desired, variable combination of the subclaims and methods, even those not illustrated in the drawings.

The drawings show schematic, simplified diagrams of preferred embodiments of the devices and methods according to the invention, omitting details which are known to a person skilled in the art according to the general prior art or those which can be considered known according to the teaching disclosed in the listed previously known patent and laid-open documents.

"Electric vehicle" or "electric car/hybrid car" mean not only passenger cars but also all other single- or double-track road-going means of transportation such as heavy goods vehicles (HGVs), buses and two-wheeled vehicles such as bicycles with electric auxiliary motors, electric scooters or electric motorcycles and tricycles, electrified wheelchairs etc. At least in some cases, different parts of the described technical teaching, inventive systems, components and technical methods can also be used in military vehicles, far example tanks and other military vehicles including trailers.

The at least partial use of inventive components in a suitable and modified form or variation in rail vehicles such as trains, trams, underground trains, overhead trains, maglev trains (Transrapid) or also mining vehicles etc. is possible and likewise included in this invention and the patent claims.

The patents and laid-open documents. U.S. Pat. No. 4,032,829 of 22 Aug. 1975, U.S. Pat. No. 5,578,877 of 13 Jun. 1994, DE 295 18 322 U1 of 18 Nov. 1995, U.S. Pat. No. 6,952,060 B2 of 7 May 2001, DE 102 20 846 A1 of 8 May 2002 and WO 2005/089347 A3 describe shock absorbers for motor vehicles, which generate electricity during compression and extension of the vehicle wheel suspension by means of what are known as linear generators integrated in the shock absorber. The function is in principle identical to the known rotary generators for electricity generation in technical and physical terms and is part of the known prior art, for which reason a detailed description is omitted.

These are first approaches to generating electricity by converting kinetic energy and gravitational energy which acts on the vehicle body during driving. The electricity is in this case generated in these "generator shock absorbers" during driving by the vertical movements of the wheels.

The disadvantage of these and similar inventions is that the yield of electricity is comparatively low at no more than approximately 5%, as only a very small portion of the gravitational energy acting on the vehicle can be absorbed and converted into electrical energy owing to the design. Most of the gravitational energy is absorbed by the tyres with their flexing movements, the negative acceleration energy of the bouncing wheels (weight) and the suspension elements of the wheel suspensions, which largely convert the respectively effective components of the gravitational energy into useless and undesirable acceleration forces of the body (up and down movements) or heat energy which is emitted into the atmosphere.

This is where the main inventive concept of the present invention applies, the essential object of which is an energy-autonomous vehicle with in-vehicle energy generation in order in this manner no provide the electric vehicle with enough energy capacity to compensate the previously insufficient in-vehicle storage capacity and thus to rectify the main disadvantage of current hybrid/electric car designs according to the prior art, namely lack of range and the very long recharging time of the additionally very expensive and bulky electricity storage elements (batteries/capacitors).

A further, enormous economic advantage, and a very positive side effect for the car owner, of this invention is that the operating costs (petrol, diesel, gas and maintenance with oil changes) are almost completely eliminated or considerably reduced.

In a further development of the prior art for electricity generation by converting kinetic and gravitational energy according to the above-cited prior art and analogous inventions, the novel technologies for electricity generation from gravitational and kinetic energy (horizontal centrifugal force, vertical acceleration) described below are proposed according to the invention as follows:

1. Electricity generation by linear generators which are known in principle and are coupled in the inner radius of the vehicle wheels, preferably to the wheel suspensions or are attached in or to the vehicle body virtually vertically or at any desired suitable angle and move the actuator (magnet element) of the linear generator, which actuator is freely movable on a guide rail, vertically up and down within the electromagnetic field of a stator spatially surrounding it during driving by the vertical movements caused by gravity of the wheels or body, as a result of which electricity is generated according to the known laws of induction, which electricity is conducted to the battery and/or to high-capacity capacitors and stored there.

2. Electricity generation by linear generators which are arranged vertically horizontally at a suitable point in, on or under the vehicle body, with an effective axis 90 degrees to the longitudinal axis of the vehicle (direction of travel) which is moved with an actuator of the linear generator, which actuator is freely movable on a guide rail, within the electromagnetic field surrounding it of the stator by the centrifugal force acting on the body during cornering, as a result of which electricity is generated and conducted to the battery for temporary storage.

3. Electricity generation by linear generators which are arranged virtually horizontally at a suitable point in, on or under the vehicle body, with an effective axis 0 degrees to the longitudinal axis of the vehicle (direction of travel) which is moved with an actuator (magnet element) of the linear generator, which actuator is freely movable on a guide rail, within the electromagnetic field surrounding it of the stator by the kinetic energy (positive and negative acceleration) acting on the body during acceleration or braking of the vehicle, as a result of which electricity is generated which is conducted to the battery and temporarily stored there.

4. Electricity generation by linear generators which are arranged at a suitable point in, on or under the vehicle body, and the actuator (magnet element) of the linear generator, which is movable on a linear guide within the electromagnetic field of the stator, with suitable mechanical, hydraulic, pneumatic or suitably combined and configured devices of the above type, of which at least one actuator is coupled with a vehicle wheel or the wheel suspension thereof and absorb (s) the respective movements caused during driving by the bumps in the road surfaces with the corresponding accelerations due to gravity, and congruently the actuator (s) move (s) within the electromagnetic field and thus generate (s) electricity which is conducted to the battery and stored there. A detailed technical functional description is presented in the preferred exemplary embodiment described below.

A system according to the invention for generating electricity in the vehicle by conversion of kinetic and gravitational energy, which produces many times more electrical energy compared to the known linear generators integrated in conventional car shock absorbers as mentioned above, is described below by way of example.

In this connection, the prior art for what are known as "active chassis or suspension systems" for motor vehicles should also be cited. This includes inter alia the documents DE 102 13 156 A1, DE 42 12 839 A1, DE 103 30 344 A1, DE 38 44 803 C2, DE 41 18 823 A1, DE 43 34 227 A1, DE 41 20 758 A1, DE 36 31 876 A1, DE 41 14 783 A1, DE 38 23 044 A1, DE 195 21 747 A1, DE 42 21 088 A1, EP 0 284 053 B1, EP 0 470 991 B1, EP 0 681 533 E1, EP 0 470 166 B1, EP 0 371 709 E1, EP 0 569 429 B1, EP 0 470 993 F1, EP 0 471 734 F1.

The vehicle suspension customary until now consists of a steel spring acting on the wheel suspension, with a hydraulic shock absorber which cannot be controlled, for each wheel. This design is known as a "passive chassis system".

In addition there are what are known as "active hydropneumatic suspensions", which consist of a differential cylinder, a gas pressure store as a spring element with a constant or electronically controllable throttle as the damper element with a control valve and constant pump.

The most recent, improved developments are chassis systems which are referred to as "fully active suspensions". In this case the previous suspension components of steel springs and hydraulic shock absorbers are replaced by an electronically controlled actuating member, which influences the suspension properties in a variety of ways by means of the command signals of the control electronics and thereby considerably improves the vehicle road position.

This includes self-levelling, rapid readjustment of the lifting movements of the wheels, regulation of dynamic forces to prevent pitching and rolling movements of the body, changing the damping effect (hardness the suspension) and so on. The main advantage of these designs is the variable electronically controllable changing of chassis properties, which results in a much improved road position and therefore improved driving safety.

The fundamental systemic disadvantage is that the forces acting on the body, as resultants of the vectors of the kinetic energy of the vertical vehicle movements, which are mostly components of the gravitational forces effective as a result of road bumps, are not used to generate electricity therefrom.

Instead, this energy is converted uselessly into heat by the springs, damper elements, throttles etc. or in some cases as undesirable vehicle movements, namely mainly into vertical accelerations of the body.

The inventions relating to shock absorbers with integrated linear generators or rotary generators mentioned above are a first but completely insufficient step for converting this kinetic and gravitational energy into electricity and using it. Their efficiency may be no more than approximately 5%, as most of the gravitational energy acting on the vehicle is consumed by the vehicle springs or hydraulic throttle valves of the shock absorbers.

Proceeding from the prior art, the object of this invention is to develop these known active chassis suspension systems in a novel manner by replacing the ultimately energy-consuming components of steel springs, hydraulic shock absorbers, throttle valves etc. with a system which can realise the suspension and damping functions of previous "active" systems but converts virtually 100% of all the kinetic and gravitational energy components into electricity.

Some preferred examples of the embodiments of an energy-autonomous vehicle, which can be varied in many ways, are presented below in a simplified basic system description, omitting the technically obvious with which a person skilled in the art is familiar but which is part of the invention as well as the conceivable variations or combinations not shown explicitly.

In the drawings, the following are referred to:
(1) Vehicle wheel
(2) Suspension element (with integrated linear generator)
(2a/b/c) Piston rod guides (bearing with sealing ring)
(3) Vehicle body
(3a) Strut suspension
(4) Wheel suspension (wishbone)
(4a/4b) Joint/mount
(5) Hydraul. spring and damper element, without linear generator
(DZ) Pressure cylinder
(DK) Pressure chamber (DK.1 to DK.x)
(KO) Pressure piston
(DS.1) Pressure sensor 1
(DS.2) Pressure sensor 2
(6) Piston rod (6.1 and 6.2)
(6a) Actuator guide
(7) Linear generator
(8) Stator
(9) Hydraulic line
(9a) Hydraulic line to pressure chamber
(9b) Hydraulic line to pressure chamber
(9c) Hydraulic bypass line
(P.1) Hydraulic pump 1 for pressure chamber 4
(P.2) Hydraulic pump 2 for pressure chamber 3
(P.3) Hydraulic pump 3 for pressure chamber 2
(P.4) Hydraulic pump 4 for pressure chamber 1
(11) Actuator of linear generator ("armature")
(11a) Sealing ring
(11b) Actuator guide rod
(11c) Bearing/guide
(12) Hydraulic valve
(12a) Pressure sensor
(12b) Control valve
(13) Hydraulic reservoir
(14) Non-return valve/stop valve
(15) High pressure reservoir/gas pressure reservoir
(16) Control electronics/microprocessor
(17) Seal
(18) Rotary charger
(DZ.1) Pressure cylinder 1
(DK.1) Pressure chamber 1 of pressure cylinder 1
(DK.2) Pressure chamber 2 of pressure cylinder 1
(KO.1) Pressure piston 1 of pressure cylinder 1
(DZ.2) Pressure cylinder 2
(DK.3) Pressure chamber 1 of pressure cylinder 2
(DK.4) Pressure chamber 2 of pressure cylinder 2
(KO.2) Pressure piston 1 of pressure cylinder 2
(6.1) Piston rod of pressure cylinder 1
(6.2) Piston rod of pressure cylinder 2
(9.1a) Pressure line for pressure chamber DK.1
(9.1b) Pressure line for pressure chamber DK.2
(9.2a) Pressure line for pressure chamber DK.3
(9.2b) Pressure line for pressure chamber DK.4
(S.1) Central position sensor of actuator 11
(VG) Body weight vector
(VB) Acceleration vector (wheel suspension movement)
(A) Distance between pressure pistons KO.1 and KO.2
(OT.1) Top dead centre of pressure piston KO.1
(UT.1) Bottom dead centre of pressure piston KO.1
(OT.2) Top dead centre of pressure piston KO.2
(UT.2) Bottom dead centre of pressure piston KO.2
(X1/X2) Piston stroke of pressure piston KO.1
(Y1/Y2) Piston stroke of pressure piston KO.2
(ML.1) Central position of pressure piston KO.1
(ML.2) Central position of pressure piston KO.2
(ML.3) Central position of actuator 11
(K.hydr) Hydraulic pressure force
(K.mag) Magnetic counter force (induction force)
(W.vert) Vertical travel (spring travel acceleration)
(P1/P2) Hydraulic high pressure pump for pressure cylinder 1
(P3/P4) Hydraulic high pressure pump for pressure cylinder 2
(DSP.1) High pressure reservoir for hydraulic pumps P1 and P2
(DSP.2) High pressure reservoir for hydraulic pumps P3 and P4
(V1/2) Four-way switching valve for hydraulic pumps P1 and P2
(V3/4) Your-way switching valve to hydraulic, pumps P3 and P4
(V1.1, V2.1, V3.1, V4.1) Stop valve in hydraulic feed line
(V1.2, V2.2, V3.2, V4.2) Multi-way switching valve in feed line
(V1.3, V2.3, V3.3, V4.3) Stop valve with throttle function
(DS1.1, DS1.2, DS2.2, DS3.1, DS3.2, DS4.2) Pressure sensor
(19) Wheel hub motor
(20) Retainer of linear generator
(20a) Retaining leg
(21) Wheel hub
(22) Wheel rim
(23) Stator inner wall cylinder
(33) Hydromotor
(34) Pressure booster
(F) Wheel spring travel
(LA) Steering axle
(Vp.1) Counter pressure in pressure chamber 1 (DK.1) vector
(Vp.2) Counter pressure in pressure chamber 2 (DK.2) vector
(CS) Pressure sensor
(WS) Travel, sensor
(PS) Position sensor
(BS) Acceleration sensor
(GS) Speed sensor
(FS) Centrifugal force sensor (lateral acceleration sensor)
(LS) Longitudinal acceleration sensor, horizontal
(VS) Vertical acceleration sensor
(NS) Level, sensor The general function of the electricity generation by kinetic and gravitational energy is described schematically below. Of the wide variety of variable designs, some preferably suitable variants are described, the technical and physical principles known from the prior art not being discussed or described in detail, as they can be found if necessary in the technical literature and the cited documents.

Furthermore, a simplified description is used in that for example the expression "the pump increases the pressure" or "the valve switches" etc. means that these processes are each activated or deactivated electronically by the superordinate control electronics (16) and/or an associated microprocessor according to the algorithms stored in the programming without this being mentioned explicitly in each case.

All described and conceivable variants of the various devices and their functions and methods in the exemplary embodiments also apply analogously to all other exemplary embodiments and likewise in the case of the conceivable variants which are not described, even if explicit mention thereof is not made in the description.

Figure 2:
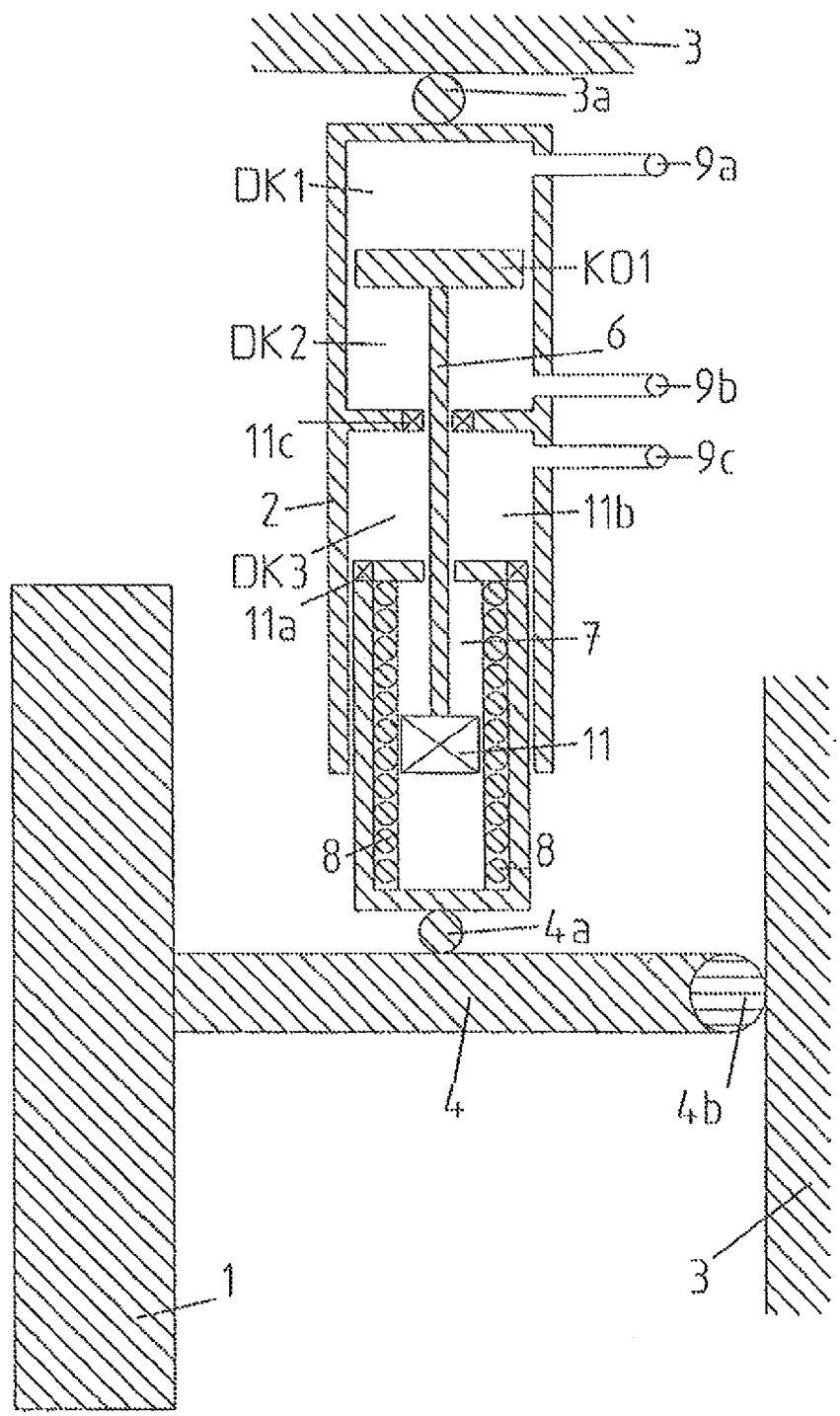

FIG. 1 and FIG. 2 show a first exemplary embodiment as a basic, identical and schematic vertical section of a vehicle wheel (1) with a wheel suspension (4) which is fastened to the body (3) with the joint (4*b*) and a suspension element (2) with an integrated linear generator (7) in the novel design according to the invention. The said spring element (2) assumes not only the known functions of suspension and damping as in the customary helical, spring and hydraulic shock absorber and all the other functions of the above-mentioned improved version of the "active suspension systems" but also realises the electricity generation according to the invention by means of the vertical wheel movements occurring during driving and the kinetic energy thereof as components of the gravity acting on the vehicle. In contrast to the designs known until now, helical springs or air spring elements and shock absorbers are therefore omitted completely.

The suspension element (2) is connected at the lower end to the wheel suspension (4) by means of a joint (4*a*) and at the upper end to the upper part of the body (3) by means of the strut suspension (3*a*). An electricity-generating linear generator (7) consisting of the stator (8), the actuator (11) and the actuator guide (6*a*) is situated in the interior. The stator (8) consists of electrically conductive windings and preferably has an interior cylindrical cavity, in which the actuator (11) is fastened to the actuator guide (6*a*), preferably as a cylindrical part, and can slide up and down inside the stator magnetic field with a minimal air gap when the actuator guide (6*a*) moves and thereby produces electricity by induction.

The actuator (11) which can be moved vertically with the pressure pistons (KO.1) and (KO.2) can alternatively consist of electrically conductive windings or preferably be configured as a suitably shaped and dimensioned permanent magnet.

The actuator guide (6*a*) is connected further on to the piston rod (6) which bears the pressure piston (KO.1) at the opposite end. The pressure piston 1 (KO.1) is part of the hydraulic spring and damper element (5) referred to as pressure cylinder 1 (DZ.1), which has at least two, ideally four pressure chambers (DK.1/DK.2/DK.3). The part of the pressure cylinder 1 (DZ.1) situated under the pressure piston 1 (KO.1) is referred to as pressure chamber 1 (DK.1), the part of the pressure cylinder 1 (DZ.1) situated above the pressure piston 1 (KO.1) is referred to as pressure chamber 2 (DK.2). Both pressure chambers 1 (DK.1) and 2 (DK.2) are separated from each other in terms of hydraulic pressure by at least one sealing ring (11*a*) mounted on the pressure piston (KO.1).

The housings of the suspension element (2) and linear generator (7) are preferably cylindrical and are mounted such that they can be displaced in a telescopic manner relative to each other with guides, for example sliding guides (2*c*), ball bearings or rolling bearings, or preferably linear ball bearings and sealed off with at least one sealing ring (11*a*), so a third pressure chamber 3 (DK.3) is formed in the inner intermediate space of the two housing parts.

The actuator guide (6*a*) and the piston rod (6) are guided in at least two guides (2*a*/*b*). At least three hydraulic lines (9*a*/*b*/*c*) lead into the at least three pressure chambers (DK.1/DK.2/DK.3). In an improved embodiment, at least six hydraulic lines are provided, three for feeding and three for discharging the fluid, as a result of which a faster pressure change is ensured due to the increased flow speed of the fluid.

Figure 3:
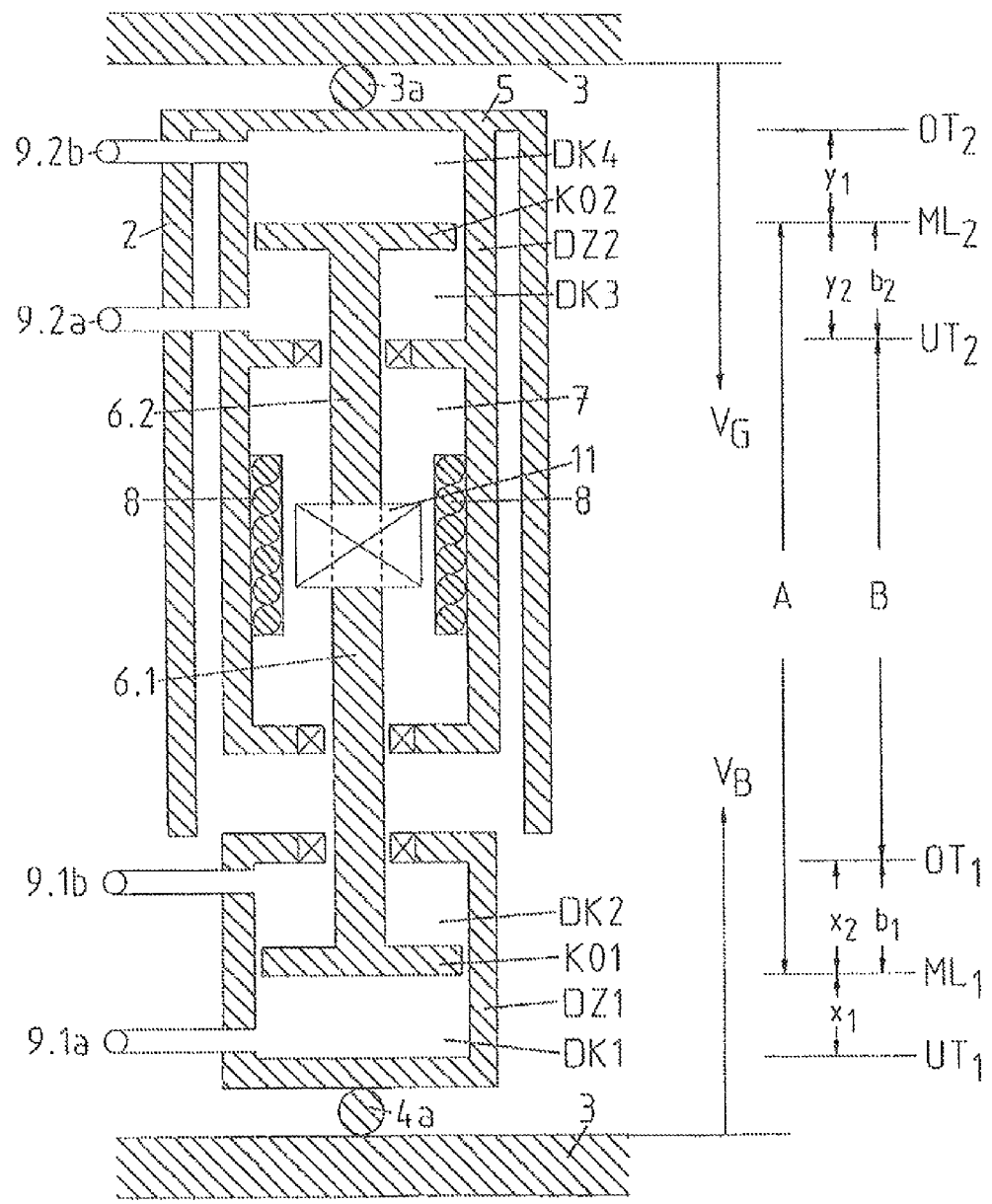
FIG. 3 is diagram of an additional exemplary embodiment of the invention, which, in contrast to that shown FIG. 1 and FIG. 2, has two pressure pistons 1 (KO.1) and 2 (KO.2).

All the same properties and functions are not described again in further versions. FIG. 3 shows a further improved version of the exemplary embodiment, which, in contrast to FIG. 1 and FIG. 2, has two pressure pistons (KO.1) and 2 (KO.2). This means that a total of four pressure chambers 1 to 4 (DK.1/DK.2/DK.3/DK.4) can be realised instead of three, as a result of which more improved technical possibilities are produced, which are described below. In this exemplary embodiment, one hydraulic line (9.1*a*/9.1*b*/9.2*a*/9.2*b*) is provided for each pressure chamber (DK.1/DK.2/DK.3/DK.4).

Figure 4:
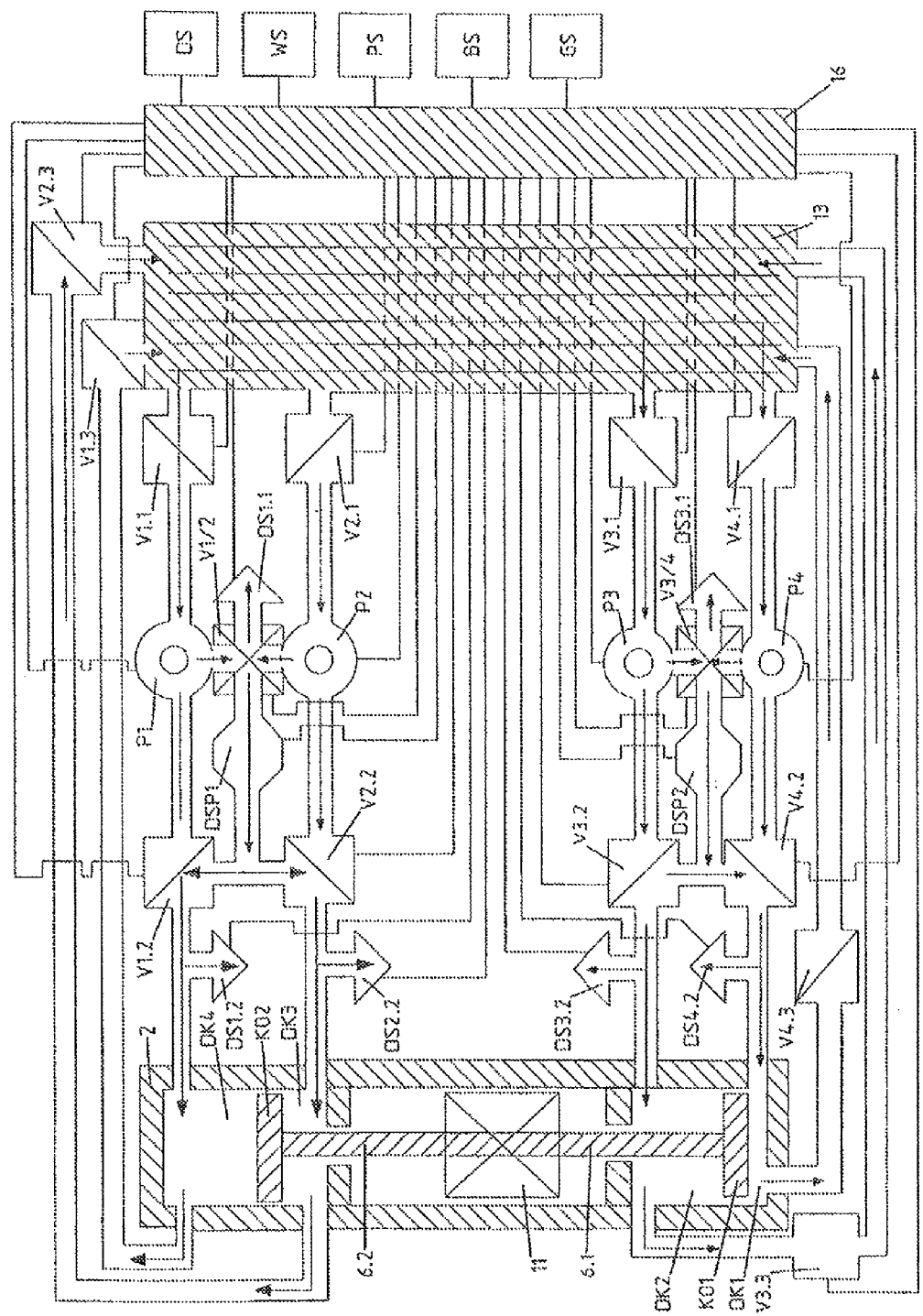
FIG. 4 is a depiction of a functional system as a pneumatic or preferably hydraulic wiring diagram with control electronics (16) and various sensors with four hydraulic feed lines (9.1a/9.1b/9.1c/9.1d) and four hydraulic discharge lines (9.2a/9.2b/9.2c/9.2d).

By way of example, FIG. 4 shows a pneumatic or preferably hydraulic wiring diagram with control electronics (16) and the various sensors and four hydraulic feed lines (9.1*a*/9.1*b*/9.1*c*/9.1*d*) and four hydraulic discharge lines (9.2*a*/9.2*b*/9.2*c*/9.2*d*). The pressure supply is provided by at least one hydraulic pump (P.1), which is preferably an oscillating pump with a pressure booster (34) connected downstream. The hydraulic wiring diagram is shown as a simplified system. In this case many variants are possible, for example only one or two hydraulic pumps can be used instead of the four shown for cost reasons, with the hydraulic lines and the valve system then being modified correspondingly.

The at least one linear generator (7) is in this case arranged centrally between the two double pressure chambers 1 and 2 (DK.1/DK.2) and 3 and 4 (DK.3/DK.4) with the associated pressure pistons 1 (KO.1) and 2 (KO.2) (FIG. 3), the respective piston rods (6.1) and (6.2) being connected to each other and the actuator (11) of the linear generator (7) being mounted fixedly in the centre thereof.

Alternatively, two linear generators (7) can also be provided on the outer sides of the at least one double pressure chamber 1 (DK.1) and optionally the double pressure chamber 2 (DK.2) situated therebetween.

The basic function of the suspension element (2) with integrated linear generator (7) shown in FIG. 3 and FIG. 4 is as follows. Hydraulic fluid is pumped into the pressure chamber 1 (DK.1) by a suitable hydraulic high pressure pump (P.4) via at least one hydraulic line (9.1*a*). The piston 1 (KO.1) is thereby lifted from its bottom dead centre (UT.1) in the direction of the vector (VB).

When it has covered the travel (X1), the central position (ML.1) is reached. A travel sensor (S1) communicates this to the control electronics (16) which then give the command to stop the feed of hydraulic fluid by means of a stop valve (V1). At this moment, the piston 2 (KO.2) is at its top dead centre (OT.2) because the housing of the pressure cylinder 2 (DZ.2) is loaded with the force of the negative vertical vector (VG), which in a four-wheeled vehicle corresponds to approximately 25% of the vehicle weight depending on the axle distribution. The valve (V1.2) is opened and hydraulic fluid is pressed into the pressure chamber 4 (DK.4). The pressure piston 2 (KO.2) is pushed downwards as far as the central position (ML.2). When it is there, the piston distance (A) is reached, which corresponds to the working position of the two pressure pistons 1 (KO.1) and 2 (KO.2).

In this case, however, the actual movement is not the piston 2 (DKO.2) going downwards, as it cannot move in this direction owing to the counter pressure of the piston 1 (DKO.1) when there is sufficient hydraulic pressure and the housing of the pressure cylinder 1 (DZ.1) is supported against the road by means of the joint (4a) with the wheel suspension (4) and the vehicle wheel (1). As long as the hydraulic pressure force in the pressure chamber 1 (DK.1) is identical to the negative force vector (VG), the actual direction of movement (lift) by the piston 2 (KO.2) is the travel (Y1) vertically upwards, as a result of which the housing of the suspension element is lifted and in turn lifts the body (3) vertically by the travel (Y1) by means of the strut suspension (3a).

The described functions can be carried out not only consecutively but preferably also simultaneously in order to achieve readiness for operation more rapidly. With a corresponding configuration of the hydraulic system with suitable seat valves, this is not necessary for the start of every journey, as the hydraulic system can maintain this basic pressure position. This is part of the known prior art and is not described in more detail.

The two pressure pistons 1 (KO.1) and 2 (KO.2) now have the working distance (A) and both are in their respective central positions (ML.1) and (ML, z). The actuator (11) is also in its central position (ML3) and expediently has the same positive and negative lift heights (X1+X2/Y1+Y2) as the pressure pistons 1 (KO.1) and 2 (KO.2).

In this connection it should be pointed out that any mechanical or hydraulic force acts on one of the two pressure pistons (KO.1/KO.2) and any positive or negative acceleration and travel covered acts in exactly the same manner on the respectively other pressure piston (KO.1/KO.2) and the actuator (11), as all three parts are permanently connected mechanically to each other by means of the piston rods (6.1/6.2). This is not mentioned explicitly in the further description of the exemplary embodiments, but is assumed to be known.

The travel and the respective positions of the two pressure pistons 1 (KO.1) and 2 (K.2) and the actuator (11) congruent with the movement are monitored constantly by at least one suitable sensor, which is preferably an electronic travel sensor (KS), which constantly registers the current position of the two pressure pistons (KO.1/KO.2) between the respective top and bottom dead centres (OT/UT) and communicates it to the control electronics (16).

The description of the function of the novel suspension element (2) with the functions according to the invention of suspension, shock absorption, active chassis control and simultaneous generation of electricity by means of the integrated linear generator follows in the exemplary embodiment of FIG. 3 as what is known as a "strut".

If it is expedient for certain reasons, the different functions according to the invention can also be realised in technically different combinations by parts which are separate from each other.

For example, if the linear generator (7) is to be configured for a higher output and therefore has a greater volume and weight, or if several, at least two vehicle wheels (1) are to output their kinetic energy to a common linear generator (7), or if at least one rotary generator (29) which is driven by at least one hydromotor (33) installed in the body is used instead of a linear generator (7).

During driving of the vehicle, the vehicle wheel (1) is moved upwards vertically by a positive travel (W.vert) for example by a road bump (FIG. 11).

This movement is a force effect and thus kinetic energy which is a resultant of the earth's gravity acting on the vehicle body. The vertical travel (W.vert), symbolised in FIG. 11 in the part of the vector (VB) (FIG. 3) as a positive vertical acceleration of the vehicle wheel (1), is transmitted via the wheel suspension (4) to the suspension element (2) and acts with the positive vertical force (K.vert.pos) exerted on the pressure cylinder housing (DZ.1) and the hydraulic fluid situated in the hydraulic pressure chamber (DK.1). The force (K.vert.pos) in FIG. 11 acts, if the counter pressure in the pressure chamber 1 (DK.2) of the pressure cylinder 1 (DZ.1) is at least equal, through the hydraulic fluid on the pressure piston 1 (KO.1) and is transmitted from the latter to the piston rods (6.1) and (6.2) and the pressure piston. 2 (KO.2). As the pressure cylinder 1 (DZ.1) is mounted such that it can be vertically displaced mechanically with respect to the outer housing of the suspension element (2) by means of a pressure-tight bearing (11a), the pressure cylinder 1 (DZ.1) is moved vertically upwards by the effective suspension movement of the wheel suspension (4) (X2 in FIG. 3).

As the pressure chamber 2 (DK.2) above the housing of the pressure cylinder 2 (DZ.2) is permanently connected mechanically to the body (3) of the vehicle by means of the strut housing (2) and the bearing (3a), a negative vertical counter force is effective here, depending on the axle distribution, at approximately 25% of the vehicle weight, which is symbolised in FIG. 3 as a vector (VG).

If the pressure chamber 4 (DK.4) is pressureless or an electronically controlled, lower pressure force is exerted on the pressure piston 2 (KO.2), than the force (K.vert.pos) acting in the positive, vertical direction, the pressure piston 2 (KO.2) logically moves upwards in the direction (Y1) of its top dead centre (OT.2). This movement is executed at the same time by the actuator (11) of the linear generator (7) which is mounted permanently on the piston rods (6.1) and (6.2), which thus moves within the magnetic field of the stator (8), as a result of which electricity is induced according to the known laws of physics, which electricity is conducted, processed and at least in part temporarily stored in a battery until it is used.

This movement of the actuator (11) within the magnetic field of the stator (8) causes a counter force (K.mag) counter to the direction of movement of the actuator (11) according to the laws of physics, as is known. This counter force (K.mag) is proportional to the magnetic field strength and has in principle the same function as the customary hydraulic shock absorbers and associated helical springs have. Furthermore, the strength of the damping effect can also be changed as desired at any time by the control electronics (16) by for example the magnetic field strength of the stator (8) and/or if appropriate the actuator (11) being varied by changing the current strength/current amplitude and thus magnetic field strength in the stator (8) or where appropriate in the actuator (11) in an electronically controlled manner, if the latter is not a permanent magnet but generates the magnetic field with a coil through which current flows. This is part of the known prior art, for which reason a detailed description is not necessary.

At least one pressure sensor (DS) per pressure chamber (DK.x) supplies the necessary information to the control electronics (16). At least one travel, sensor (WS) constantly monitors the positions of the pressure pistons 1 (DK.1) and 2 (DK.2) and communicates them to the control electronics (16), which use these parameters for the switching algorithms of the pneumatic valves.

If the magnetic damping effect clue to the magnetic counter force (K.mag) is not sufficient, the current strength/current amplitude of the current flowing through the stator (8) can be increased by the control electronics (16) shortly before the top dead centre (OT.2) is reached or previously in any other position, as a result of which the magnetic field is intensified and congruently therewith the magnetic counter force (K.mag) is increased and/or the positive vertical movement (Y1) of the pressure piston (KO.2) is braked, that is, damped and ultimately stopped, by supplying hydraulic fluid via the hydraulic line (9.2b), it also being possible for this to be varied and metered very rapidly and precisely by the control electronics/microprocessor (16) by means of suitably designed throttle valves.

The same applies to the movement of the pressure pistons 1 (KO.1) and 2 (KO.2) and to the actuator (11) in the opposite direction, the negative vertical movement. In this case, the control electronics (16) can likewise vary the current strength/current amplitude and thus the magnetic field strength and thus the magnetic counter force (K.mag) electronically as required. In addition, in order to damp the movement, of the pressure piston 2 (KO.2) if required, a metered counter force can be built up by variable hydraulic pressure, by supplying hydraulic fluid to the pressure chamber 3 (DK.3) of the pressure cylinder 1 (DZ.1). These measures should however only be activated in exceptional cases, as this corresponds in principle to the technical function of the customary hydraulic shock absorber and consequently energy is consumed uselessly, as it is not converted into electricity in the linear generator (7).

Controlled by the control electronics (16), the pressure chambers 1 (DK.1) and 2 (DK.2) of the pressure cylinder 1 (DZ.1) essentially realise the functions of the "active chassis", while the pressure cylinder 2 (DZ.2) with its pressure chambers 3 (DK.3) and 4 (DK.4) in interaction with the linear generator (7) mainly fulfil the suspension and damping functions of the system while simultaneously generating electricity.

The vertically oscillating movements of the actuator (11) within the magnetic field of the stator (8), given suitable physical design and dimensioning, effect a magnetic counter force (K.mag) to the respective direction of movement, which in principle has the same effect and function as the customary suspension components of helical springs and shock absorbers during compression and extension of the vehicle wheels (1). The pressure chamber 4 (DK.4) bears the proportional weight.

During compression of the vehicle wheel (1), the pressure piston 2 (KO.2) moves vertically from its central position (ML.2) towards the top dead centre (OT.2). This direction of movement (force vector VB) counteracts the magnetic counter force (K.mag) induced by the actuator (11) of the respective direction of movement of the actuator (11).

As soon as the pressure piston 2 (KO.2) reaches the top dead centre (OT.2) or if the compression force (W.vert.pos) has previously been compensated by the magnetic counter force (K.mag) of the actuator (11) counteracting it and thereby the pressure piston 2 (DK.2) is already stopped before the top dead centre (OT.2), the pressure piston 2 (KO.2) must come back into its central position (ML.2) in order to be able to execute a new, sufficient spring movement (FIG. 11 B/C). This happens in that the control electronics (16) receive the information that the pressure piston 2 (KO.2) has been stopped and has reached its reverse point from at least one suitable sensor, for example a pressure or preferably travel sensor (WS). A hydraulic valve is then opened, as a result of which the hydraulic fluid is fed into the pressure chamber 2 (DK.2), as a result of which the pressure piston 2 (KO.2) is moved downwards in the negative vertical direction (Y.2).

At the same time, the pressure chamber 3 (DK.3) is made largely pressureless by opening a hydraulic fluid outflow valve. This and the pressure supply to the pressure chamber 4 (DK.4) move the vehicle wheel (1) and thus the pressure piston 2 (DK.2) downwards to its central position (ML.2). As soon as this has been reached, which is communicated by the central position sensor (S.1) of the control electronics (16), the pressure piston 2 (DK.2) is stopped in this position by stopping the hydraulic fluid supply to the pressure chamber 4 (DK.4). This must then keep the same amount of pressure built up as corresponds to the body weight vector (VG) and bear this weight.

At the same time, the pressure chamber 3 (DK.3) is kept pressureless for rapid reactions in the event of extension movements of the vehicle wheel (1). If a further sensor, preferably a pressure sensor (DS.x) establishes that the wheel (1) must extend further in order to have continuous contact with the road, this extension movement can be continued until the pressure piston 2 (DK.2) reaches the bottom dead centre (UT.2).

The actuator (11) also generates electricity and absorbs shocks with its magnetically induced counter force (K.mag) during this downward movement of the pressure piston 2 (KO.2). If the pressure piston 2 (KO.2) reaches its bottom dead centre (UT.2) and a still further extension of the vehicle wheel (1) is necessary, the pressure chamber (DK.2) of the pressure cylinder 1 (DZ.1) can also be reduced in pressure or made pressureless. At the same time, the pressure in the pressure chamber 1 (DK.1) can be increased. The travel (X.2) for extension of the vehicle wheel (1) is also available.

In this case, however, there is no electricity generation of the linear generator (7). The functions during return (compression) are the same but in the reverse order.

At the same time the hydraulic system realises the spring effect of the customary steel springs in the vehicle wheel suspension (4), that is, the compensation of the static load by the vehicle weight (negative vertical vector VG) in that the pressure (force effect) in the hydraulic chambers 1 (DK.1) to 4 (DK.4) is in each case at least exactly equal to the weight acting on each vehicle wheel (1).

It can be seen from FIG. 3 that the design components of pressure cylinder 1 (DZ.1) with pressure piston 1 (KO.1), piston rods (6.1/6.2) and pressure cylinder 2 (DZ.2) with pressure piston. 2 (KO.2) during their interaction according to the invention assume the bearing and suspension functions of the steel springs customary until now and also allow further options in the sense of what is known as an "active chassis" by means of the algorithms of the control electronics/microprocessor (16). These functions are part of the prior art, but without the novel technical possibility according to the invention of simultaneous electricity generation by means of integrated or alternatively external, spatially separate, hydraulic or mechanically coupled electricity generators, which can be situated in the interior or on the outside of the body, which can be suitably designed, coupled linear generators CO as described or can alternatively be at least one rotary generator (29) which is driven mechanically, pneumatically or preferably hydraulically by a hydromotor (33) and thus produces electricity.

Self-levelling can also be realised at any time without problems by corresponding programming of the control electronics (16). This takes place by changing the working distance (A) of the pressure pistons (KO.1) and (KO.2) for the two wheels of a vehicle axle. If the vehicle, for example the rear axle, is loaded more by loading, the working distance (A) is reduced by the change in load due to the load force (b). The distance (B) is made congruent again with the distance (A) by increasing the pressure in the pressure chamber 1 (DK.1) and/or reducing the pressure in the pressure chamber 2 (DK.2) and/or alternatively increasing the pressure in the pressure chamber 4 (DK.4) and/or reducing the pressure in the pressure chamber 3 (DK.3) and thus the same level is reached again.

Furthermore, there is also the possibility of for example reducing the height distance of the body from the road surface during motorway driving in that the pressure piston distance (X1) is controlled electronically, preferably reduced depending on the speed.

This has the advantage that the vehicle centre of gravity is lower and the road position of the vehicle is thereby improved. Moreover, this in conjunction with certain aerodynamic measures reduces the air resistance, that is, the "cw value" and the energy consumption influenced by it.

A further optimal possibility is the compensation of centrifugal forces during cornering by changes in the height of the body of the two outer-curve wheels with respect to the inner-curve wheels, in that for example in the struts (2) of the inner-curve wheel suspensions (4), the working distance of the pressure pistons (X1/X2) is reduced variably in proportion to the speed or the effective centrifugal force and/or in the struts (2) of the outer-curve wheel suspensions (4), the working distance of the pressure pistons (X1/X2) is increased variably in proportion to the speed or the effective centrifugal force.

Further functions are the compensation of rolling and pitching movements of the body by corresponding similar electronically controlled strut activities, which can be activated by the control electronics (16) by means of corresponding programming algorithms and control commands.

These basic functional processes are part of the prior art, particularly in similar designs of the known active hydropneumatic chassis systems.

Figure 5:
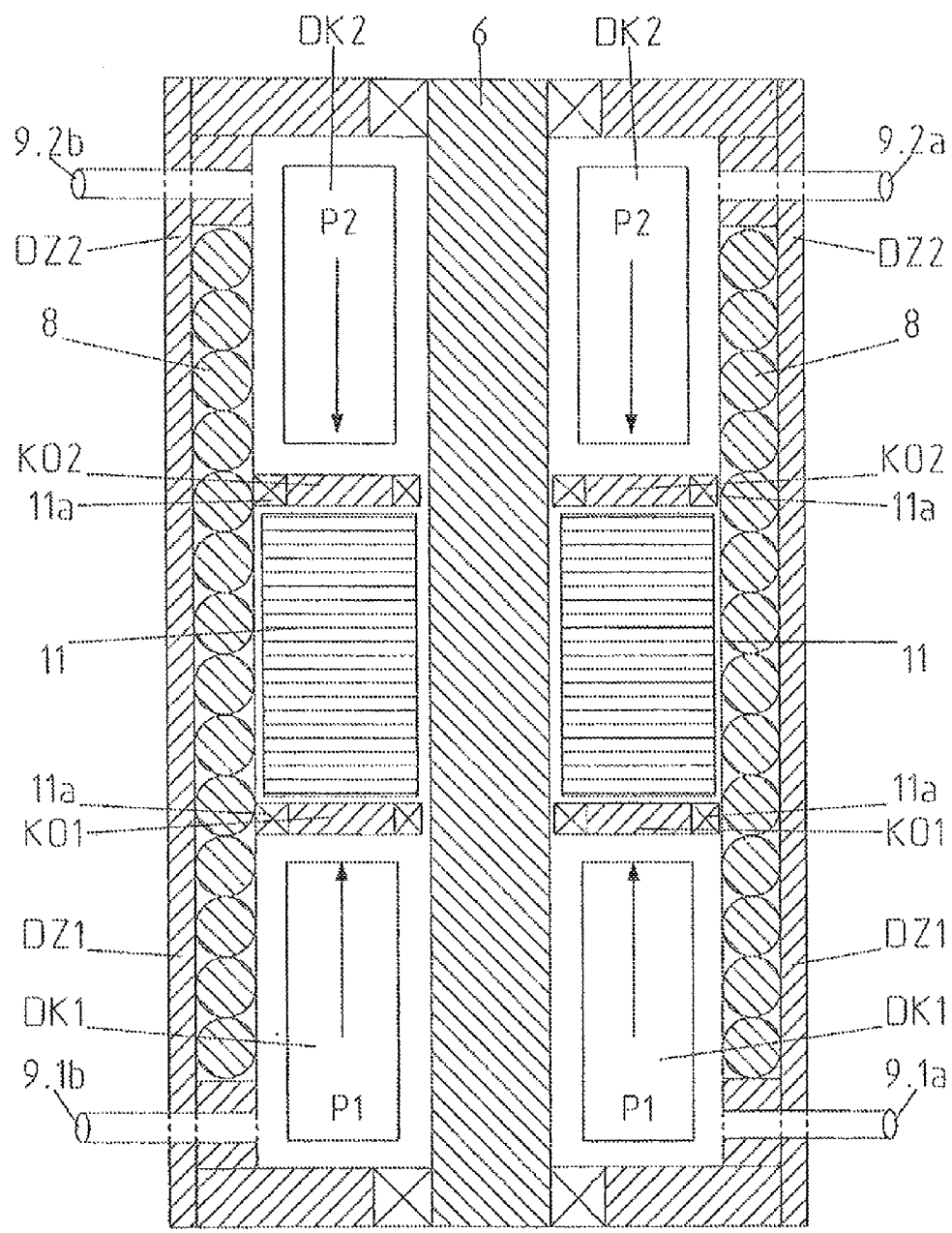
FIG. 5 is a depiction of an exemplary variant embodiment of the invention that has a particularly compact construction.

FIG. 5 shows a further preferred variant as an exemplary embodiment. This design has a particularly compact construction, because the actuator (11) simultaneously assumes the function of the pressure pistons 1 and 2 (KO.1/KO.2) owing to its particular design. As can be seen in FIG. 5, the pressure pistons 1 and 2 (KO.1/KO.2) together with the actuator (11) form a common part.

Figure 6:
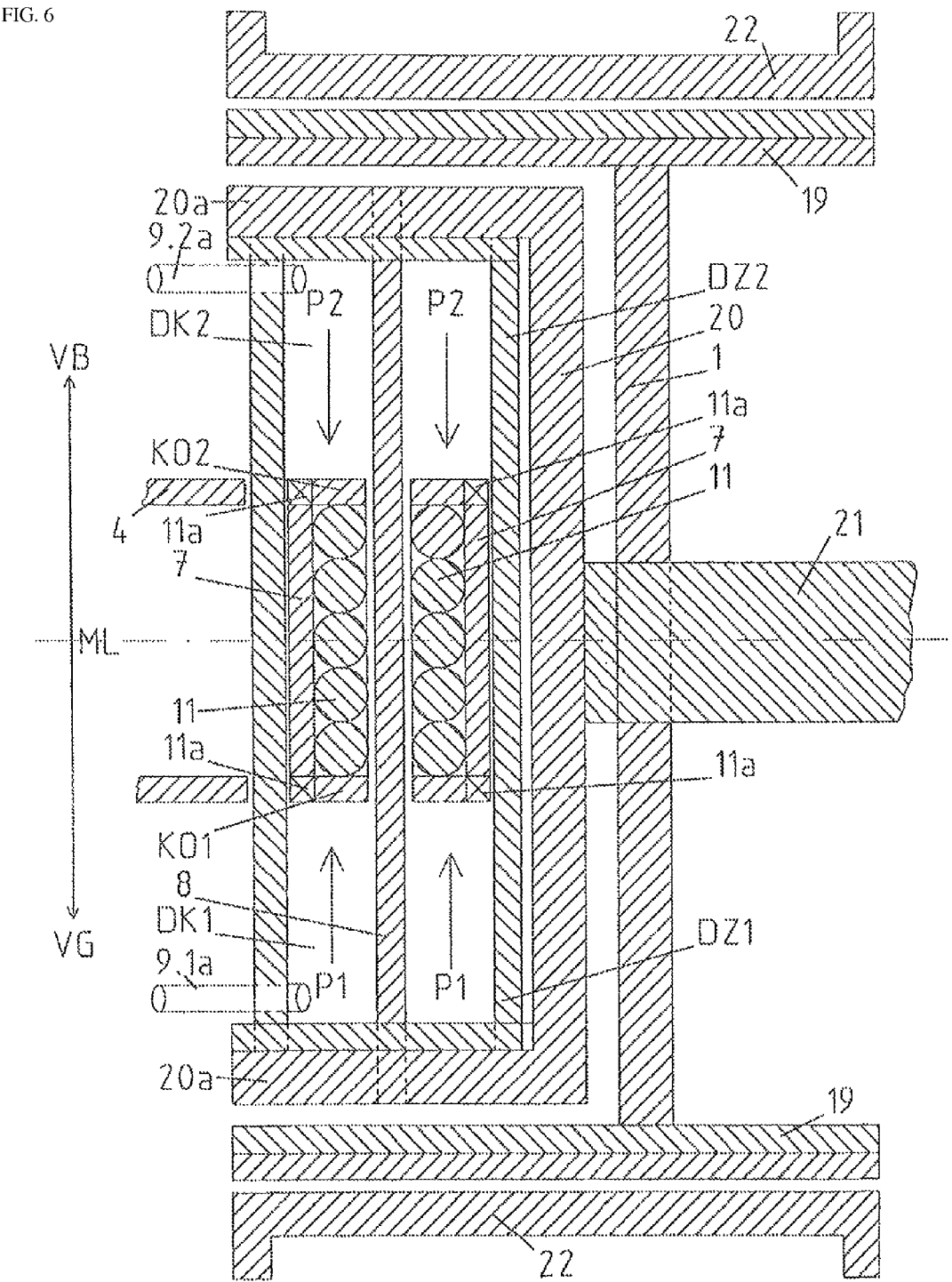
FIG. 6 is a central, vertical partial section of a vehicle wheel (1) with a suspension element (2).
Figure 7:
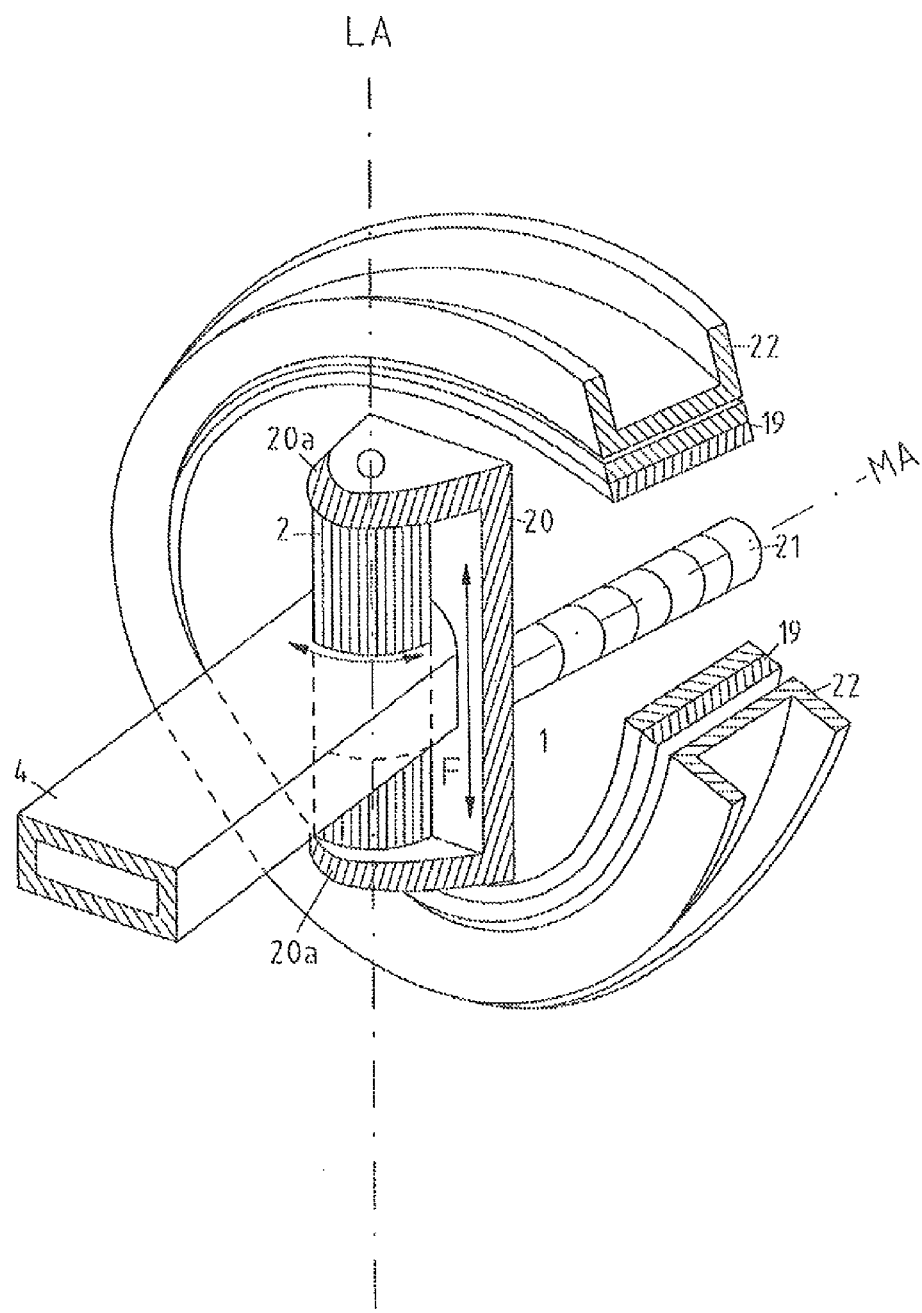
FIG. 7 is a simplified, partially cut away perspective view of a vehicle wheel (1) with a suspension element (2).

This compact construction advantageously makes it possible for the suspension and shock absorber element (2) with the integrated linear generator (7) to be mounted in the region of the inner cavity of the vehicle wheel rim (22), as shown by way of example in FIGS. 6 and 7.

FIG. 6 is a central, vertical partial section and FIG. 7 is a simplified, partially cut away perspective view of a vehicle wheel (1) with a suspension element (2). The structure and function in this variant of the further exemplary embodiment are analogous to the above configurations, the differences being essentially shown in FIGS. 5 and 6 as follows:

A hollow cylindrical stator (8) is built into the preferably cylindrical housing of the suspension element (2). A smooth-surfaced cylinder-like inner wall (23) is arranged in the inner cavity of the hollow cylindrical stator (8), which wall consists of a material which is permeable to magnetic fields. The likewise cylindrical actuator (11) is situated in the inner cavity of the cylindrical stator (8) and has a cylindrical inner cavity through which the round actuator guide rod (11b) is guided which is fastened with its lower and upper end in the respective bearings (11c) which are parts of the pressure cylinder 1 (DZ.1) and 2 (DZ.2).

The pressure piston 1 (KO.1) is mechanically permanently connected to the lower end of the actuator (11) and the pressure piston 2 (KO.2) is likewise mechanically permanently connected to the upper end. Both pressure pistons 1 and 2 (KO.1/KO.2) bear on their inner and outer radii at least one sealing ring (11a) each, which ensures precise guiding and pressure sealing with respect to the inner sliding wall (23) of the stator (8) and the cylindrical outer face of the actuator guide (11b). As the height of the actuator (11) is much shorter than the inner cylindrical space of the stator (8), as can be seen immediately in FIG. 6, the pressure chamber 1 (DK.1) is thereby formed under the pressure piston 1 (KO.1) and the pressure chamber 2 (DK.2) is formed above the pressure piston 2 (KO.2). The associated hydraulic lines (9.1a/9.1b and 9.2a/9.2b) lead into these at a suitable point.

With corresponding supply of hydraulic fluid into the two pressure chambers 1 and 2 (DK.1/DK.2) with an electronically controlled change in pressure, the two pressure pistons 1 and 2 (KO.1/KO.2) slide up and down together with the mechanically permanently coupled actuator (11), the latter generating electricity by induction in a known manner. The other functions are produced in a similar manner from the above-described properties and functions of the other variants.

FIG. 5 and FIG. 6 show a further variant as an exemplary embodiment. A modification of the variants shown in FIG. 3 is possible in that the pressure cylinder 1 (DZ.1) and 2 (DZ.2) are configured without the linear generator (7) situated in a separate housing and carry out only the above-described hydraulic functions for suspension, damping, active chassis etc.

The at least one linear generator (7) is in this case moved to a suitable position on, under or in the body (3) and coupled in terms of energy (hydraulically) to the at least two pressure cylinders 1 and 2 (DZ.1/DZ.2) per vehicle wheel (1) via hydraulic lines (9ff).

The two pressure pistons 1 and 2 (KO.1/KO.2) form a common part which separates the two pressure chambers (DK.1) and (DK.2). This variant has the advantage that a smaller installation height of the piston unit (KO.1/KO.2) and thus a greater lift (spring travel) and lower weight is produced while the distance between the upper and lower retaining legs (20a) (FIG. 6) (total length of the actuator guide) stays the same owing to the omission of the actuator (11).

The proportional vehicle weight (VG) is in this case supported by the pressure chamber 1 (DK.1), which is filled with hydraulic fluid by the hydraulic pump (P.1) via the hydraulic line (9.1a) and a single-way stop valve (14), and the equal counter pressure (Vp.1) present there and is constantly monitored by the pressure sensor (DS.1). See FIG. 4, example of a hydraulic/electronic wiring diagram.

When there is a compression movement (VB) of the vehicle wheel (1) vertically upwards, the hydraulic pressure (K.hydr) in the pressure chamber (DK.1) increases. This is registered by the pressure sensor (DS.1) and, when a limit value is exceeded, the control electronics (16) open a control valve (12a) in the hydraulic line (9.1b), which valve leads firstly to a hydropneumatic high pressure reservoir (15) and from there is connected through hydraulic lines (9.x) to the linear generator (7), which preferably has the configuration described in conjunction with FIG. 5.

The opening of the control valve (12a) results in a reduction in pressure in the pressure chamber 1 (DK.1) and the hydraulic fluid is conducted via a single-way stop valve (14) into at least one hydropneumatic high pressure reservoir (15) and temporarily stored there under the corresponding pressure, or preferably conducted via the bypass line (9c) into the pressure chamber 2 (DK.2).

The pressure is reduced in the pressure chamber 1 (DK.1) only as far as the lower pressure limit value, which corresponds to the proportional vehicle weight (VG) until the equalisation of the equivalent hydraulic counter force (K.hydr) is achieved and the central position (ML.2) of the pistons 1 and 2 (KO.1/KO.2) is re-established.

The at least one hydropneumatic high pressure reservoir (15) can be provided individually for each vehicle wheel (1)

or alternatively this can also be designed and used for several vehicle wheels (1), that is, their hydraulic spring and damper elements (5).

From this hydropneumatic high pressure reservoir (15), the hydraulic line (9.1*b*) leads via a further control valve (12*h*) and at least one pressure booster (3*d*) to the at least one linear generator (7), which for example preferably has the configuration described in conjunction with FIG. 5, or alternatively to at least one hydromotor (33), which drives the at least one rotary generator (29), wherein hydraulic fluid under high pressure is supplied alternately to the hydraulic chambers 1 and 2 (DK.1/DK.2) in the linear generator (7) from the hydropneumatic high pressure reservoir (15) through an electronically controlled shuttle valve (12*b*) via the hydraulic lines (9.1*a*) and (9.1*b*), as a result of which the pistons 1 and 2 (KO.1/KO.2) are moved to and fro at a high frequency, which then results in the inductive generation of electricity in a known manner by the coupled actuator (11), which electricity is temporarily stored in a suitable storage medium (battery capacitor). The excess hydraulic fluid is fed back into the hydraulic reservoir (13) via the hydraulic discharge lines (9.2*a*) and (9.2*b*).

Other advantages of this exemplary embodiment are: The kinetic energy of at least two or more vehicle wheels (1) can act on only one linear generator (7), which entails advantages in terms of performance and cost.

Moreover, the unsprung masses in the vehicle wheels (1) are reduced and the linear generator (7) can have larger dimensions and therefore produce more power, that is, generate more electricity.

Alternatively, at least one rotary generator (29) can be used in this design instead of the at least one linear generator (7), which rotary generator is driven by at least one hydromotor (33), which generates the necessary hydroenergy, that is, hydraulic pressure, from the pressure cylinders 1 and 2 (DZ.1/DZ.2) from the components of kinetic and gravitational energy of the relative movements of the body and at least one vehicle wheel (1).

Alternatively, a pneumatic system with gaseous pressure media and/or at least some mechanical transmission elements or any desired suitable system combinations of hydraulics, pneumatics and/or mechanics can be used instead of hydraulic fluid.

FIG. 6 shows a further varied use example. This shows a vertical partial cross section and FIG. 7 shows a perspective partial section of a vehicle wheel (1) with a wheel hub (21), a wheel rim (22) with a built in wheel hub motor (19) of known design, for example according to patent GB 2 440 251. (Prior art)

The wheel rim (22) is screwed onto the outer side of the wheel hub (21) as usual. A suitably designed and dimensioned support (20), at the upper and lower ends of which a retaining leg (20*a*) projects, which is preferably offset at an angle, is mounted on the opposite inner side of the wheel hub (21). The actuator guide (11*b*) is mounted vertically in the 90 degree position with respect to the central axis of the wheel hub (21) between the upper and lower retaining legs (20*a*). If required, the said guide can also be arranged inclined at any desired suitable angle with its upper end in the direction of the rear of the vehicle, in order to improve tracking.

The actuator (11) can optionally be configured as a suitably dimensioned and shaped permanent magnet or consist of windings through which current flows and which emit the necessary electromagnetic field. As described in connection with FIG. 5, the actuator (11), together with the pressure pistons 1 (KO.1) and 2 (KO.2), forms a mechanically permanently connected part and is for its part configured as a hollow cylindrical double pressure piston (KO.1/KO.2), the functions of which are in principle identical to those shown in FIG. 5 and described in detail.

In contrast to the variant which is described in connection with FIG. 5, in this case the movable actuator (11), which is likewise provided with one pressure piston 1 (KO.1) and 2 (KO.2) in each case on its upper and lower sides, is permanently connected mechanically to the vehicle body (3) via a stable support (4). The spring movement of the vehicle wheel (1) thus takes place due to the up and down movement of the retainer (20) together with the actuator guide (11*b*) in the bearing (11*c*) and the pressure pistons 1 (KO.1) and 2 (KO.2) mounted on the actuator (11).

If the actuator (11) is for example configured with electrical windings, the actuator guide (11*b*) can be produced from a suitable magnetised material, and thus emit a magnetic field as a permanent magnet. Alternatively, the stator (8) can also surround the actuator (11) radially as a hollow cylindrical part with a coil function, as shown in FIG. 5.

The pressure cylinders 1 (DZ.1) and 2 (DZ.2) with their pressure chambers 1 (DK.1) and 2 (DK.2) shown in FIG. 6 function in principle in a similar manner to the above-described exemplary embodiments, in particular in connection with FIG. 5. The difference and advantage of this configuration is that in this case the steering axle (LA) of the vehicle wheel (1) coincides with the centre axis of the actuator guide (11*b*).

The possibility therefore exists of constructing simple and relatively inexpensive all-wheel steering. The steering movement can in this case be configured conventionally (mechanically) with a steering linkage or electromotively ("steer by wire"). This principle is a fundamentally known technology and can be used alternatively in this case.

The above-described embodiments of the invention use components of the kinetic energy and gravity from the vertical relative movements between the body (3) and vehicle wheel (1) in the suspension for conversion into electrical energy.

A further possibility according to the invention for in-vehicle energy generation is the conversion of kinetic energy components from positive and negative acceleration forces, for example the vertical body movements during driving, the horizontal negative accelerations in the direction of travel during braking, and the centrifugal forces acting on the body (3) during cornering.

To this end, special linear generators (7) are provided in the vehicle, the effective axes (central axes) of which are situated horizontally and vertically, the horizontal effective axes of the linear generators (7) being in the longitudinal direction of the vehicle (direction of travel) and alternatively being arranged in a 90 degree position with respect to the longitudinal direction of the vehicle.

The linear generators (7) used are similar to the configuration shown in FIG. 5 and can have any desired suitable length. The structure of the linear generator (7) and actuator (11) can be cylindrical with a round cross section and suitable diameter or a cubic part which has a rectangular, polygonal or any other shaped cross section.

The configuration of the linear generator (7) provided for this purpose has an actuator (11), which for example is arranged on the guide (11*b*) such that it can move very easily by means of a recirculating ball bearing and can follow the acceleration and/or centrifugal forces acting on it due to the actuator's (11) own weight and behaves in a freely oscillating manner and thus executes a linear movement in the magnetic field of the stator (8) and thus produces electricity.

A considerable improvement in efficiency is achieved if the linear generator (7) has a pressure-tight housing and a virtual vacuum prevails, in the housing interior, as a result of which the movements of the freely oscillating actuator (11) are less inhibited.

With the horizontal attachment of the linear generator (7) in the 90 degree position with respect to the longitudinal axis of the vehicle for capturing the (cornering) centrifugal forces, the actuator (11) can be moved in a freely oscillating manner between the two end positions by the effective centrifugal forces.

With the vertical attachment of the linear generator (7) and with the attachment in which the effective axis coincides with the longitudinal axis of the vehicle, the freely oscillating actuator (11) must expediently always be brought back to a central position (ML) as soon as it has reached one of the end positions. This can take place mechanically by means of suitably dimensioned springs or be effected by means or magnetic counter forces of oppositely poled permanent magnets or by electrical magnetic coils which are mounted on the actuator guide (11b) in the two end positions and are automatically activated when the end position is reached.

Alternatively, but with greater technical effort and expense, this can also be done pneumatically or hydraulically with electronic regulation in a similar manner to that described above for the wheel spring systems.

In addition, for better understanding of the basic functioning of the above-described hydraulic suspensions and damping element (2) in the conversion of kinetic energy from components of gravity into electricity by means of an integrated or mechanical, alternatively hydraulically coupled generator, preferably a linear generator (7), a diagram is shown in a simplified form not to scale in FIG. 8 and FIG. 9, and the basic function is described in more detail as follows.

This invention employs a novel vehicle suspension and damping system, which uses none of the previously customary energy-consuming elements (steel spring or air bag and hydraulic shock absorber), but preferably a special, inventive hydraulic suspension and damping element which is coupled mechanically or hydraulically to a suitable electricity generator, preferably a linear generator (7), situated in the separate housing or is combined as a common component.

In order to prevent misunderstandings, it must be noted that this technology is of course not "perpetual motion" or intended to be a direct conversion of gravity into electricity. This is because the energy required for producing electricity is supplied externally in sufficient quantities constantly during driving in the form of the previously unused kinetic energy of the vehicle wheel suspension movements, which is converted into electricity, this kinetic energy being a resultant of the vehicle weight, which is caused by the earth's gravity.

In this respect, this novel technology according to the invention is an indirect conversion of components of the gravitational forces which are realised physically in the vehicle weight into electricity with the aid of the kinetic energy from the previously unused wheel spring movements, which is absorbed by the linear generator (7).

Although the conventional steel springs or air bags including hydraulic shock absorbers are omitted, their known technical functions including self-levelling and "active chassis" are retained. The suspension and damping element (2) with the integrated electricity generator (7) converts the kinetic energy of the bouncing vehicle wheels (1), which are components of the vehicle weight as resultants of gravity, into electricity in significant quantities with a very good level of efficiency. The amount of electricity produced is congruent with the vehicle weight.

The greater the weight, the higher the electricity yield. With a total vehicle weight of for example 2 tonnes, a (weight) force of approx. 500 kg acts on each vehicle wheel (1) with the spring movement, as a result of which large quantities of energy can be generated even with relatively low suspension lifts which occur constantly due to road bumps, depending on weight and design.

The amount of electrical energy generated in this case can be determined as an approximate average value using a simplified theoretical consideration as follows. The variable parameters of suspension lift of the vehicle wheels, boosting of effective force by means of mechanical and/or hydraulic force boosters, dimensioning and efficiency of the linear generators, energy losses due to transmission elements etc. are not taken into account or are considered constants for the sake of simplicity.

In an electric vehicle with, for example, a total weight of two tonnes and four wheels, each with one of the linear generators according to the invention, the amount of electricity generated per kilometer driven is calculated as follows:

Assuming that each of the four wheels has an average suspension travel of +/−10 mm per decimeter of distance traveled, a suspension travel of 200 m per wheel is calculated over one kilometer traveled. The total suspension travel for all four wheels is therefore 800 m per kilometer traveled. At the assumed weight of 500 kg (approx. 5,000 N) per vehicle wheel (1), which acts as kinetic energy on the linear generator (7), and given the premises assumed above, this produces energy generated in this manner of 4,000,000 Nm (4 MNm) per kilometer traveled. This is approx. 1.1 kWh per kilometer traveled. Assuming (unrealistically high) energy conversion losses at least 0.5 kWh/cm or 50 kWh per 100 km traveled remain.

This is more than enough energy, not only for the electric drive motors but also for the additional consumers such as heating, air conditioning etc., which can be temporarily stored in batteries and/or capacitors.

Reference is made to the "Tesla Roadster" manufactured by Tesla Motors USA, which has already been developed for series production, as an example of the average amount of current which the drive motor of an electric car needs. The 3-phase asynchronous motor used there with a power of 185 kW has an electricity consumption of 12 to 18 kWh per 100 km traveled (average 133 Wh/km).

As already mentioned, the system can not only fulfil the usual suspension and damping functions, but also vehicle self-levelling and also all the other possibilities of what is known as an "active chassis" for the elimination of pitching and rolling movements of the body in a highly efficient manner with a corresponding design. A body inclination to the inner radius of the curve can also be realised during cornering. In one variant, all-wheel drive and all-wheel steering can be integrated without problems. See for example FIG. 7 in this respect.

Figure 8:
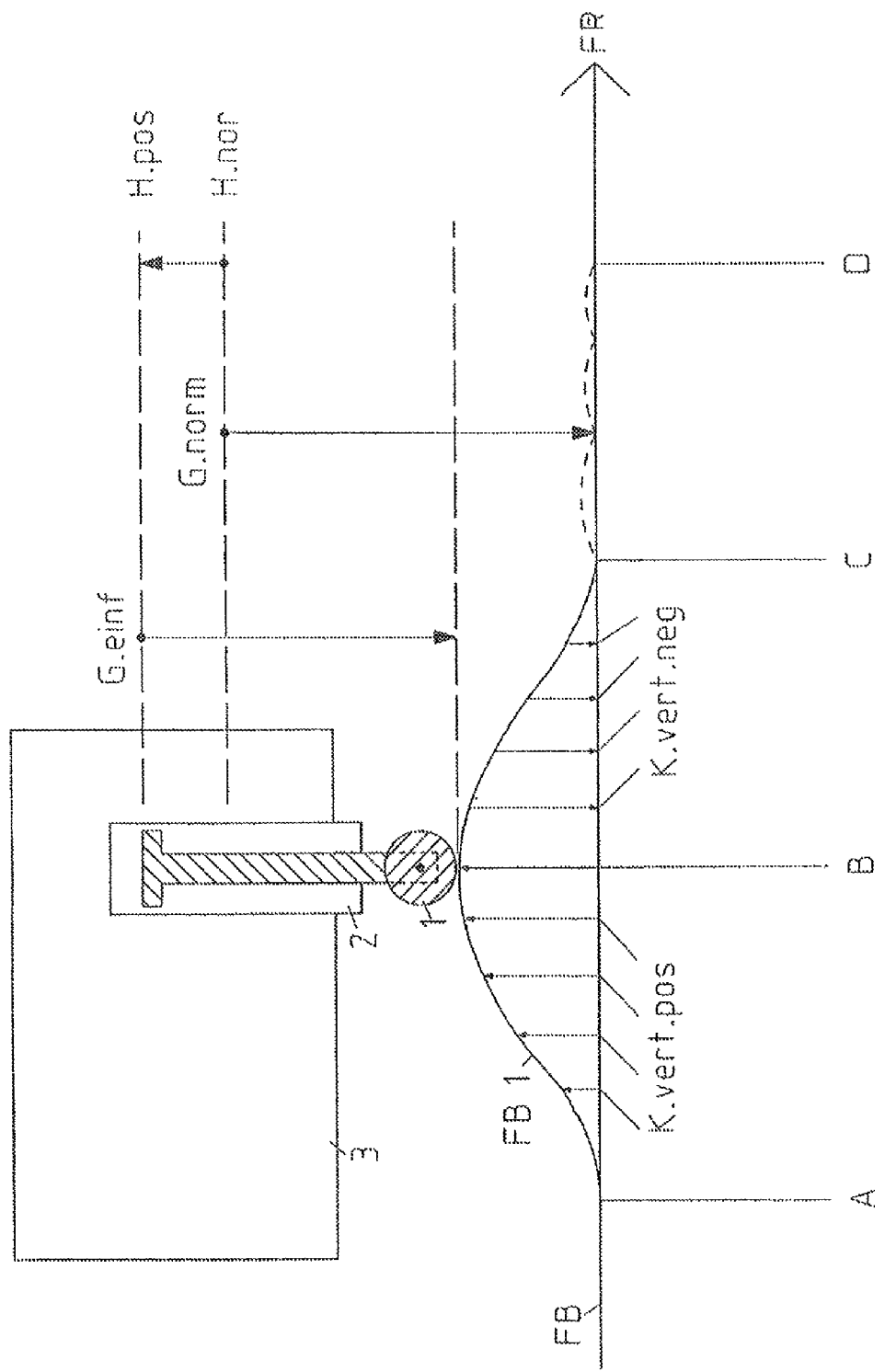
FIG. 8 is a depiction of the movement of a vehicle wheel travelling over an elevation in a road surface.
Figure 9:
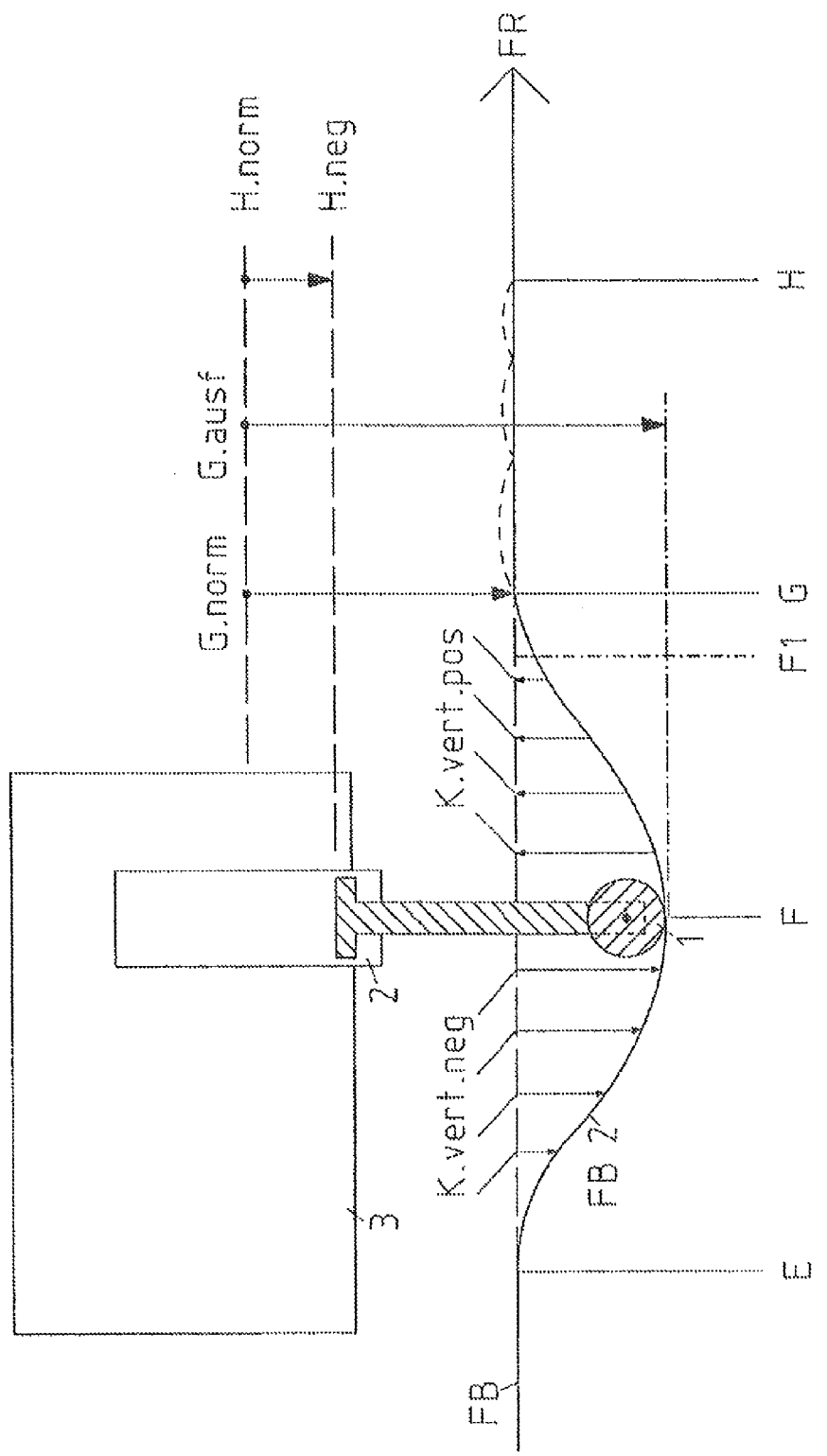
FIG. 9 is a depiction of the movement of a vehicle wheel travelling through a dip in a road surface.

FIG. 8 and FIG. 9 refer to:
Vector, direction of travel (FR)
Road surface (FB)
Road surface elevation (FB.1)
Road surface depression (FB.2)
Body height, normal (H.norm)
Body height, above normal (H.pos)
Body height, below normal (H.neg)
Vector, weight during compression (G.einf)
Vector, weight during extension (G.ausf)
Vector, weight at normal height (G.norm)
Vector, vertical force, positive direction (K.vert.pos)
Vector, vertical force, negative direction (K.vert.neg)

Travel, compression with road surface elevation (A>B)
Travel, extension with road surface elevation (B>C)
Travel with damping rebound 1 (C>D)
Travel, extension with road surface depression (E>F)
Travel, compression with road surface depression (F>G)
Travel with damping rebound 2 (G>H)
Travel sensor (WS)
Pressure sensor (DS)
Magnetically induced counter force (K.mag)
Hydraulic pressure force (K.hydr)

FIG. 8 shows the movement of the vehicle (3) in the direction of travel (FR). The road surface elevation (FB.1) begins at position (A) and extends as far as position (C). The vehicle wheel (1) moves over the distance (A>C), with the travel (A>B) effecting a compression of the wheel.

At position (B) the vehicle wheel (1) reaches the highest point or the maximum compression travel.

The forces acting here increase progressively as the vector (K.vert.pos) shows. They act counter to the weight force, shown as vector (G.norm), which is exerted via the suspension element (2) with the variable hydraulic pressure on the vehicle wheel (1).

During the distance (B>C), the vehicle wheel (1) makes an extension movement and reaches the normal level of the road surface (FE) again at position (C).

Electricity is generated in a known manner by induction in the coupled linear generator (7) both during the compression movement and during the extension movement of the vehicle wheel (1).

If the damping effect by the magnetic counter force (K.mag) of the linear generator (7) during electricity production is not sufficient, the vehicle wheel (1) makes a few weakening spring after-movements, which are absorbed and damped by the elastic vehicle tyres.

In the event of excessive vertical residual forces and insufficient damping by the tyres, the body (3) is lifted vertically out of its normal body height (H.norm) to the above-normal body height (H.pos), as a result of which the excess residual energy is consumed.

When the vehicle wheel (1) moves from position (A) to (B) it moves vertically upwards, as a result of which the hydraulic pressure is increased because the additional force (K.ver.pos) is exerted on the pressure cylinder (DK-4).

This is registered by the travel sensor (WS) and/or the pressure sensor (DS) and communicated to the control electronics (16). The latter outputs the signal to reduce the pressure or switches the associated pressure chamber (DK.4) to the pressureless state by means of the valve. The compression movement (K.vert.pos) of the vehicle wheel (1) can thus take place without resistance, and the linear generator (7) which is activated in the process can convert virtually 100% of the kinetic energy during compression into electricity until the vehicle wheel (1) has reached position (B).

In the process, this electricity generation produces the magnetic counter force (K.mag) in the linear generator (7), in accordance with the known physical induction laws, which magnetic counter force is effective as a force vector in the opposite direction to the compression movement and damps it until the speed and movement at position (B) is zero.

The damping effect by the magnetic counter force (K.mag) can be varied as required within a wide range by the control electronics (16) with very fast reaction speeds by means of a variable regulation of the current and the magnetic field strength resulting therefrom in accordance with the stored parameters and circuit algorithms, as a result of which the spring rating (damping strength) and thus the suspension properties and road position can be adapted very rapidly and automatically according to requirements.

As the vehicle (3) moves further in the direction of travel (FR) from position B to C, the vehicle wheel (1) bounces back from the maximum position B until it reaches the normal level of the road surface (FB) at position C.

This extension movement is also used to obtain electricity and is effected by the vehicle wheel's (1) own weight (gravitational force) and that of its components (tyres, rim, hub, brake, wheel suspension). The forces which are effective here are shown symbolically in the diagram FIG. 8 with the vectors (K.vert.neg).

If required, the control electronics (16) can influence the extension positively or negatively (accelerate or brake) by means of the hydraulic pressure in the respectively associated pressure chamber (DK.x), which has a correspondingly positive or negative effect on the total efficiency of the system when generating electricity, as this hydraulic braking corresponds to a conventional "shock absorber function" and thus reduces the amount of electricity produced.

At the same time, a pressure and volume equalisation between the pressure chambers 4 (DK.4) and 3 (DK.3) is provided by means of a hydraulic bypass line (9c), which is opened or closed if required by the control electronics (16) with a stop valve (14) mounted therebetween, so that an equal pressure constantly prevails in both pressure chambers 4 (DK.4) and 3 (DK.3), which corresponds to the proportional vehicle weight which loads the suspension element (2). The advantage of this is that less hydraulic energy is lost thanks to this design and the total efficiency (amount of electricity) is much higher, as the hydraulic pump (P.x) has to pump less hydraulic fluid and only compensates the flow losses in terms of energy in the lines and at the valves (pressure losses/flow resistances).

When the vehicle wheel (1) has reached position C, the normal force, the vector weight (G.norm) acts on it. The vector weight (G.norm) is approximately 25% of the total vehicle weight per wheel, with equal axle load distribution. In this electricity generating system, a greater vehicle weight is advantageous for the efficiency.

With a road surface elevation or depression of small area, at least two linear generators (7) are activated in the associated front and rear wheel when driving over it. If the elevation or depression extends over the whole width of the road surface or at least the vehicle width (lane width), all the linear generators (7) are activated in all four vehicle wheels (1).

The distance from C to D is the rebound region, when any kinetic residual energies are still present which have not been sufficiently damped. In the region from C to D the vehicle wheel (1) may still have the tendency to bounce out again. This inhibits the now fiat road surface (FB) so that residual forces which are still present either must be compensated by the control electronics (16) by means of the hydraulics and/or the tyres of the vehicle wheel (1) absorbs these forces and deforms and/or the vehicle body is lifted positively (vertically) in an undesired manner from the normal height (H.norm) to the height (H.pos). The vertical negative forces which are effective here mean that the tyres of the vehicle wheel (1) continue to keep in contact with the road surface (FE) and do not lift off temporarily, which would be detrimental to driving safety.

In the case of tyre deformation and a vertical body movement, the associated kinetic or primary components of the gravitational energy are of course lost for electricity generation with the linear generators (7), for which reason the programming (algorithms) of the control electronics (16) must ideally be designed in such a manner that this is avoided.

In the alternative case, when the vehicle wheel (1) travels through a dip in the road surface or a pothole (distance E to G in FIG. 9), the function of the electricity recovery is in principle identical.

FIG. 9 shows the movement of the vehicle wheel (3) in the same direction of travel (FR). The road surface depression (FB.2) begins at position E and extends to position G. The vehicle wheel (1) moves over the distance (E>G), with the vehicle wheel (1) executing an extension movement over the distance (E>F).

At position F the vehicle wheel (1) reaches its lowest point or the maximum extension travel. The forces effective here increase progressively as the vector (K.vert.neg) shows.

All the force (G.norm), shown as vectors (K.vert.neg), which correspond to approx. 25% of the total vehicle weight, basically acts as kinetic energy, which can be converted by the linear generator (7) into electricity, on the linear generator (7), which then converts this kinetic energy and the associated components of the primary gravitational energy into electricity, with the magnetic counter force (K.mag) ("Lorentz force") which arises during the electricity induction counteracting this extension movement and exerting a movement-damping effect, which corresponds in principle to that of a customary hydraulic shock absorber and furthermore can be adapted in its effect (damping force) very quickly and within very wide ranges by the control electronics (16) in a variable manner according to requirements by electrical modulation of the current and so the congruent magnetic field strength and the magnetic counter force depending thereon ("Lorentz force") according to the laws of physics.

When the vehicle wheel (1) has reached position. F, the control electronics (16) receive information through the travel sensor (WS) and pressure sensor (IDS) that the extension movement has finished.

The control electronics (16) then switch the associated hydraulic chamber (DK.4) (FIG. 3) to its pressureless state so that the subsequent compression movement over the distance from F to G is virtually without hydraulic resistance and the linear generator (7) uses the kinetic energy from the forces of the vector (K.vert.pos) for generating electricity with an optimum efficiency of almost 100%.

At the same time, the hydraulic bypass line (9c) is opened, as a result of which the pressure and volume equalisation of the hydraulic fluid in the two pressure chambers 3 (DK.3) and 4 (DK.4) takes place. The fluid is therefore conducted from the pressure chamber 4 (DK.4) to the pressure chamber 3 (DK.3), the pressure P (P.hydr) at the same time remaining constant, which is monitored by the control electronics (16) with the aid of the pressure sensors DS.3 and DS.4.

When position G has been reached, the vehicle wheel (1) is again at the normal road surface level (FB). The compression movement (K.vert.pos) must be terminated here by the compression forces being damped to the value zero by the magnetic induction counter force (K.mag), as otherwise rebound movements of the vehicle wheel (1) would take place over the distance from G to H, which would be detrimental for the road position of the vehicle (3).

The control electronics (16) must therefore adapt the magnetic counter force (K.mag) correspondingly to the respective requirements by corresponding variation of the strength of the coil current in the linear generator (7), in order to ensure by means of the induced strengthening or weakening of the induced magnetic counter force (K.mag) that the compression movement of the vehicle wheel (1) has finished at or shortly before position G, so that the wheel does not rebound or even lift but remains on the road surface.

If, in exceptional cases, this magnetic damping (K.mag) should not be sufficient, the control electronics (16) can actively suppress the undesired rebound by corresponding hydraulic counter pressure measures (pressure increase in pressure chamber DK.4) as a result of electronic activation of compensatory counter forces (K.hydr), which cancel out the residual energies and terminate or brake the compression movement.

The patent claims can be found below. All the described features and variants of the invention and the equivalent designs thereof which are not explicitly described, along with the associated patent claims and the described devices and methods and variants which can be derived therefrom can be essential to the invention both individually and in any combination and variation and can be used in any desired variably combined applications in practice.

The invention claimed is:

1. A vehicle for transporting persons and/or goods, which vehicle alternatively moves on water, on the ground or in the air and at least partially uses electrical energy and electric motors as a drive medium,
wherein the electrical energy used is produced mainly or for a substantial part within the vehicle from the conversion of solar radiation and kinetic energy during braking, from the headwind, and from components of the kinetic energy of gravitational effects on the vehicle body, wheels and wheel suspensions and components of the kinetic energy of centrifugal forces and positive or negative vertical acceleration movements of the vehicle body (3), vehicle wheels (1) and wheel suspensions (4), with subsequent temporary storage of the electricity generated in this manner in batteries or other suitable storage media, for example high-capacity capacitors, until use of the electricity in the drive motors of the vehicle or other electricity consumers,
wherein the suspension and damping element (2) is connected at the lower end to the wheel suspension (4) by means of a joint (4a) and is connected at the upper end to the upper part of the body (3) by means of the strut suspension (3a), and an electricity-generating linear generator (7) is situated in the interior, which consists of the stator (8), the piston rod (6.1/6.2) situated in the central axis and the actuator (11) mounted thereon,
and wherein the piston rod (6.1/6.2) bears the pressure piston 1 (KO.1) at one end and the pressure piston 2 (KO.2) at the other end, wherein the pressure pistons 1 and 2 (KO.1/KO.2) are part of the hydraulic spring and damper element (5) in the pressure cylinders 1 (DZ.1) and 2 (DZ.2).

2. The vehicle according to claim 1 wherein the stator (8) consists of electrically conductive windings and preferably has an interior cylindrical cavity, in which the actuator (11) is fastened to the piston rod (6.1/6.2) or surrounds the latter over the entire length thereof, preferably as a cylindrical part, and slides up and down inside the stator magnetic field with a minimal air gap when the piston rod (6.1/6.2) moves and thereby generates electricity by induction in a known manner.

3. The vehicle according to claim 1 wherein the preferably vertically movable actuator (11) either consists of electrically conductive windings or is preferably configured as a suitably shaped and dimensioned rare earth permanent magnet.

4. The vehicle according to claim 1 wherein the linear generator (7) is arranged centrally between the double pressure chambers 1 and 2 (DK.1/DK.2) and 3 and 4 (DK.3/DK.4) with the associated pressure pistons 1 (KO.1) and 2 (KO.2) and the respective piston rods (6.1) and (6.2) are connected to each other and the actuator (11) of the linear generator (7) is mounted fixedly in the centre thereof. (FIG. 3).

5. A method of using the vehicle according to claim 1, the method being for producing in-vehicle electrical energy by converting components of the kinetic energy of the vehicle and components of the gravity acting on the vehicle body into electricity,
wherein the method is carried out with at least one double-action hydraulic cylinder, referred to as hydraulic spring and damper element (2)+(5), per vehicle wheel, which is connected in a suitable manner to the vehicle wheel suspension (4) and/or to the vehicle body (3) and thus absorbs at least some of the kinetic energy and components of gravity as forces and transmits them mechanically and/or pneumatically and/or preferably hydraulically to any suitably arranged and technically, electrically and electromagnetically suitably designed electricity generator, preferably a linear generator (7), the integrated actuator (11) of which is excited into high-frequency oscillating vibrations by the kinetic and gravitational energy acting on the vehicle in interaction with suitable pneumatic or preferably hydraulic systems and elements and electronic circuits, and electricity is thereby generated by induction by the linear generator (7) in a known manner,
wherein the control electronics (16) provided with suitably programmed algorithms control all functions electronically using the relevant sensor parameters of pressure, travel, position, acceleration, speed including other relevant parameters of vehicle and driving states such as speed, delay, lateral acceleration etc.,
and wherein the travel and the respective positions of the two pressure pistons 1 (KO.1) and 2 (K.2) and the actuator (11) congruent with the movement are monitored constantly by at least one suitable sensor, which is preferably an electronic travel sensor (WS) and/or at least one pressure sensor (DS), and thus the current position of the two pressure pistons (KO.1/KO.2) between the respective top and bottom dead centres (OT/UT) is registered and communicated to the control electronics (16).

6. The method according to claim 5 wherein at least two vehicle wheels (1) output their kinetic energy in the form of hydraulic pressure (K.hydr) to a common linear generator (7).

7. The method according to claim 5, wherein the movement of the actuator (11) in the magnetic field of the stator (8) causes a counter force counter to the direction of movement of the actuator (11) which is proportional to the magnetic field strength and in principle effects the same function (movement damping) as the customary hydraulic shock absorbers and associated helical springs, wherein the strength of the damping effect is varied by the control electronics (16) by changing the magnetic field strength of the stator (8) and/or where applicable of the actuator (11) as a result of electronically controlled change in the current strength/current amplitude and thus of the magnetic field strength in the stator (8) or where applicable in the actuator (11), if the latter generates its magnetic field by means of a coil through which current flows.

8. The method according to claim 5, wherein the magnetic damping effect which causes the magnetically induced counter force (K.mag) is varied electronically, and the positive vertical movement (Y1) of the pressure piston (KO.2) is braked, that is, damped and in exceptional cases stopped as required shortly before the top dead centre (OT.2) is reached or if required in any other position by supplying hydraulic fluid via the hydraulic line (9.2b), wherein this can also be carried out in a variably metered manner by the control electronics (16) by means of suitably designed throttle valves.

9. A method according to claim 5 wherein self-levelling is realised by corresponding programming of the algorithms in the control electronics (16) by changing the working distance (A) of the pressure pistons 1 (KO.1) and 2 (KO.2) in each case for the two wheels (1) of a vehicle axle, wherein a greater load due to loading reduces the working distance (A) by the change in load due to the loading force (b), which makes the distance (B) consistent again with the distance (A) by means of an increase in pressure in the pressure chamber 1 (DK.1) and/or a reduction in pressure in the pressure chamber 2 (DK.2) and/or alternatively an increase in pressure in the pressure chamber 4 (DK.4) and/or a reduction in pressure in the pressure chamber 3 (DK.3), and thus re-establishes the same height level of the vehicle centre axis.

10. A method according to claim 5, wherein an at least partial compensation of centrifugal forces during cornering by changes in the height of the body of the two outer-curve wheels with respect to the inner-curve wheels is realised in that the control electronics (16) variably reduce the working distance of the pressure pistons (5.1c/5.2c) from the struts (2) of the inner-curve wheel suspensions (4) in proportion to the speed or the effective centrifugal force and/or the working distance (A) of the pressure pistons (5.1c/5.2c) in the struts (2) of the outer-curve wheel suspensions (4) is variably increased in proportion to the speed or the effective centrifugal force, as a result of which the inner-curve side of the vehicle (1) is below the normal height (H.norm) and the outer-curve side of the vehicle (1) is above the normal height (H.norm), and the transverse axis of the vehicle thus assumes a position which is inclined with respect to the horizontal in the direction of the inside of the curve.

11. The method according to claim 5, wherein the proportional vehicle weight (VG) is in this case supported by the pressure chamber 1 (DK.1), which is filled with hydraulic fluid by the hydraulic pump (P.1) via the hydraulic line (9.1a) and a single-way stop valve (14), and the equal counter pressure (Vp.1) present there and is constantly monitored by the pressure sensor (DS.1) and if required changed in an electronically controlled manner.

12. A method of using the vehicle according to claim 5 for producing in-vehicle electrical energy by converting components of the kinetic energy of the headwind acting on the vehicle body owing to the movement of the vehicle into electricity, characterised in that the headwind is conducted through air turbines, and the latter are set in rotation, and this rotation of the at least one air turbine drives at least one suitably designed and dimensioned electricity generator.

13. A method of using the vehicle according to claim 1, the method being for producing in-vehicle electrical energy by converting components of the kinetic energy of the vehicle and components of the gravity acting on the vehicle body into electricity, wherein the at least one hydropneumatic high-pressure reservoir (15) is provided with pressure boosters (34) for each vehicle wheel (1) or alternatively is designed in dimensions and technical properties and used as a hydraulic spring and damper element (5) for several vehicle wheels (1).

14. A vehicle according to claim 1, wherein the at least one air inlet opening of at least one air ram pressure duct (25) (air funnel), which tapers conically in the direction of the second (outlet) opening thereof and receives and accelerates the headwind, is situated at a suitable point on the vehicle, preferably on the front part.

15. A method of using the vehicle according to claim 1, the method being for in-vehicle electricity generation by converting components of the vertical kinetic vehicle energy from positive and negative acceleration forces (vertical body movements) and horizontal positive and negative accelerations in the longitudinal axis of the vehicle and centrifugal forces occurring in the 90 degree direction to the longitudinal axis of the vehicle (cornering), wherein the linear generator (7) contains an actuator (11), which is arranged on the actuator guide (11*a*) in an easily movable and preferably ball-bearing mounted manner, and a vacuum prevails in the preferably pressure-tight housing of the linear generator (7).

* * * * *